US009574890B2

(12) United States Patent
Annapureddy et al.

(10) Patent No.: US 9,574,890 B2
(45) Date of Patent: Feb. 21, 2017

(54) REDUCED POWER CONSUMPTION AND IMPROVED USER EXPERIENCE WHEN NAVIGATING ALONG FAMILIAR ROUTES

(71) Applicant: QUALCOMM Incorporated, San Diego, CA (US)

(72) Inventors: Koushik Annapureddy, Tampere (FI); Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/195,997

(22) Filed: Mar. 4, 2014

(65) Prior Publication Data

US 2015/0253146 A1 Sep. 10, 2015

(51) Int. Cl.
*G01C 21/36* (2006.01)
*H04W 52/02* (2009.01)
(Continued)

(52) U.S. Cl.
CPC ........... *G01C 21/36* (2013.01); *G01C 21/3484* (2013.01); *G01C 21/3641* (2013.01); *G01S 19/34* (2013.01); *G06F 1/3206* (2013.01); *H04K 3/415* (2013.01); *H04M 1/72572* (2013.01); *H04W 52/0264* (2013.01); *Y02B 60/50* (2013.01)

(58) Field of Classification Search
CPC ... G01C 21/26; G01C 21/265; G01C 21/3484; G01C 21/3617; G01C 21/3688; G01C 21/36; G01C 21/3641; G01C 21/00; G08G 1/096827; G01S 19/24; G01S 19/34; G06F 1/3203; G06N 99/005; H04K 3/415; H04W 52/0264; H04M 1/72572; Y02B 60/50
(Continued)

(56) References Cited

U.S. PATENT DOCUMENTS 6,256,579 B1 * 7/2001 Tanimoto ..................... 701/533
8,228,234 B2   7/2012 Fong et al.
(Continued)

FOREIGN PATENT DOCUMENTS

EP             2072951 A2   6/2009
WO     WO-2010040385 A1   4/2010

OTHER PUBLICATIONS

International Search Report and Written Opinion—PCT/US2015/018426—ISA/EPO—May 22, 2015

*Primary Examiner* — Abby Lin
(74) *Attorney, Agent, or Firm* — Muncy, Geissler, Olds & Lowe, P.C.

(57) ABSTRACT

The disclosure generally relates to techniques that may reduce power consumption and improve user experience when using a personal navigation device or other mobile device to navigate along familiar routes or road segments. In particular, in response to a current position associated with the device corresponding to a familiar road segment (e.g., based on an index indicating how often the road segment was previously traversed), voice assistance and a display may be disabled and/or a frequency at which a receiver acquires signals to determine the current position may be reduced. Furthermore, a navigation application executing on the device may be automatically exited if the familiar road segment further includes a route destination. In other use cases, road segment familiarity and travel histories may be used in route planning, managing incoming calls or messages, and media playback, among other things.

35 Claims, 13 Drawing Sheets

(51) Int. Cl.
    *G06F 1/32* (2006.01)
    *H04K 3/00* (2006.01)
    *G01S 19/34* (2010.01)
    *G01C 21/34* (2006.01)
    *H04M 1/725* (2006.01)

(58) Field of Classification Search
    USPC .................................... 701/424, 490, 526
    See application file for complete search history.

(56) References Cited

U.S. PATENT DOCUMENTS

| | | | |
|---|---|---|---|
| 8,332,140 | B2 | 12/2012 | De Silva et al. |
| 8,417,448 | B1* | 4/2013 | Denise .......................... 701/410 |
| 2009/0055088 | A1 | 2/2009 | Zhang et al. |
| 2009/0164115 | A1* | 6/2009 | Kosakowski et al. ........ 701/201 |
| 2009/0215466 | A1* | 8/2009 | Ahl et al. ................... 455/456.1 |
| 2010/0297930 | A1 | 11/2010 | Harris |
| 2011/0054775 | A1 | 3/2011 | Snyder |
| 2011/0294520 | A1 | 12/2011 | Zhou et al. |
| 2012/0158283 | A1 | 6/2012 | Arastafar |
| 2012/0209489 | A1* | 8/2012 | Saito et al. ..................... 701/70 |
| 2012/0310526 | A1 | 12/2012 | Mizuno et al. |
| 2013/0303106 | A1* | 11/2013 | Martin ....................... 455/404.2 |
| 2015/0032424 | A1* | 1/2015 | Gupta ................... G01C 21/00 703/2 |

\* cited by examiner

| Journey Log :: Traveled Road Segments |            | Index |
|---------------------------------------|------------|-------|
| S0                                    | 02.25.2013 | 1     |
| S1                                    |            | 0     |
| S2                                    |            | 0     |
| S3                                    | 02.25.2013 | 1     |
| S4                                    | 02.25.2013 | 1     |
| S5                                    |            | 0     |
| S6                                    |            | 0     |
| S7                                    | 02.25.2013 | 1     |

| Journey Log :: Traveled Road Segments | | | | Index |
|---|---|---|---|---|
| S0 | 02.25.2013 | 02.26.2013 | | 2 |
| S1 | | | | 0 |
| S2 | | | | 0 |
| S3 | 02.25.2013 | 02.26.2013 | | 2 |
| S4 | 02.25.2013 | | | 1 |
| S5 | 02.26.2013 | | | 0 |
| S6 | 02.26.2013 | | | 0 |
| S7 | 02.25.2013 | 02.26.2013 | | 2 |

☐ : Route proposed by PND

☐ : Route repeatedly travelled by driver

Result: road segment S2 now has higher priority than S1 in route calculation.

REDUCED POWER CONSUMPTION AND IMPROVED USER EXPERIENCE WHEN NAVIGATING ALONG FAMILIAR ROUTES

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States. Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc.), such on-board devices may be used to provide relative position, velocity, acceleration, and/or orientation information.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile device may employ an SPS receiver that can provide position information independent of the information derived from the signals transmitted by the base stations. Moreover, position accuracy can be improved by combining measurements derived from both SPS and AFLT systems using conventional techniques. Furthermore, navigation devices often support popular and increasingly important SPS wireless technologies, which may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more on-board inertial sensors (e.g., accelerometers, gyroscopes, etc.) to measure an inertial state of the navigation device. Inertial measurements obtained from these on-board inertial sensors may be used in combination with or independent of navigation signals received from satellite and/or terrestrial based transmitters and/or inertial sensors on a vehicle (e.g., accelerometers, gyroscopes, odometers, etc.) to provide estimates of geographic position and heading.

Although GNSS-based navigation systems can help users to navigate to destinations when users do not know or are uncertain about the routes to the destinations, there are many situations in which the positioning engine in a mobile device continues to operate even though the user may be traveling on a known road segment or the remaining journey to the destination is already known to the user. In at least these scenarios, a personal navigation device (PND) or other mobile device should be able to detect that the road segment or remaining journey to the destination is already known and act accordingly to improve user experience and reduce battery drain, which tends to be one of the most significant problems faced when using mobile devices in a navigation context (whether in a vehicular or pedestrian mode). For example, a mobile device that supports call and message handling tasks may be mounted in a car to perform navigation tasks and PNDs can likewise perform call and message handling tasks when connected to a suitable mobile device. Accordingly, one device (e.g., a mobile device or PND) can support navigation tasks in addition to call and message handling tasks, but users should focus on navigation tasks with high priority when traveling on unknown road segments or road segments that have substantial turns or other spatial characteristics that may require focused attention on driving over other non-navigation tasks. Furthermore, although existing navigation applications allow a device to reject incoming calls, any autoreply messages provided in response to the incoming calls are typically pre-set (e.g., "Hi, I am driving and will call you back") or only provide limited information based on a current location (e.g., based on a speed and location output, an autoreply message may be "Hi, I am at <LOCATION> and will call you back later"). Accordingly, there exists substantial opportunities to reduce battery drain and otherwise improve user experience based on road segment familiarity or other navigation contexts that may have an impact on how much user attention may (or should) be required at a particular point in time.

SUMMARY

The following presents a simplified summary relating to one or more aspects and/or embodiments associated with the mechanisms disclosed herein to reduce power consumption and improve user experience when using a personal navigation device (PND) or other mobile device to navigate along familiar routes or otherwise familiar road segments. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein to reduce power consumption and improve user experience when navigating along familiar routes or road segments in a mobile context in a simplified form to precede the detailed description presented below.

According to one exemplary aspect, a method for reducing power consumption and improving user experience when using a mobile navigation device to navigate along familiar routes may comprise, among other things, determining a current position associated with the mobile navigation device, determining whether the current position associated with the mobile navigation device corresponds to a familiar road segment, and disabling voice assistance and a display on the mobile navigation device in response to determining that the current position associated with the mobile navigation device corresponds to the familiar road segment. Furthermore, in one embodiment, the method may further comprise reducing a frequency at which a receiver on the mobile navigation device acquires one or more signals to determine the current position associated with the mobile navigation device in response to determining that the current position associated with the mobile navigation device corresponds to the familiar road segment and/or automatically terminating a navigation application executing on the mobile navigation device in response to determining that the familiar road segment includes a final destination associated with the mobile navigation device. In one embodiment, in response to reducing the frequency at which the receiver acquires the signals to determine the current position, signals acquired from one or more motion sensors on the mobile navigation device may be used to advance the current position associated with the mobile navigation device, and in response to the advanced current position corresponding to an unfamiliar road segment, the voice assistance and the display may be enabled and/or the frequency at which the receiver acquires the signals to determine the current position may be increased.

According to another exemplary aspect, the method may further comprise storing a navigation database that includes a plurality of road segments, wherein the navigation database may associate each road segment with an index that indicates a familiarity associated therewith based at least on how many times the road segment has been previously traversed, wherein the current position associated with the mobile navigation device may be determined to correspond to the familiar road segment in response to the index associated therewith exceeding a predetermined threshold and a current velocity not exceeding a predefined speed limit. Alternatively, in one embodiment, the current position associated with the mobile navigation device may be considered familiar in response to the current road segment having substantially no turns for a predefined distance and in response to further determining that a current velocity does not exceed a predefined speed limit. Furthermore, in one embodiment, each road segment in the navigation database may be associated with one or more dates or timestamps that indicate when the respective road segments were traversed, and the familiarity index may be reduced in relation to any road segments associated with dates or timestamps indicating that the respective road segments have not been traversed within a predetermined time period. In addition, in response to receiving a request to plan a route to a final destination, the method may further comprise determining preferred road segments that include one or more road segments traversed in one or more previous routes that did not match road segments initially included in the previous routes and calculating the route associated with the mobile navigation device to prioritize the preferred road segments and road segments having indices that exceed the predetermined threshold.

According to another exemplary aspect, the method may further comprise managing incoming calls or messages, wherein an incoming call may be accepted if the current position associated with the mobile navigation device corresponds to the familiar road segment or alternatively the incoming call may be rejected if the current position associated with the mobile navigation device corresponds to an unfamiliar road segment. In the latter case, rejecting the incoming call may comprise generating an autoreply message indicating an estimated time when the rejected incoming call will be returned based on an estimated travel time from the current position to a familiar road segment. Furthermore, in response to updating the current position associated with the mobile navigation device and determining that the updated current position corresponds to a familiar road segment, the rejected incoming call may be automatically returned. In a similar respect, incoming messages may be stored while the current position corresponds to an unfamiliar road segment and subsequently displayed in response to the current position corresponding to a familiar road segment or a current velocity equaling zero, wherein the stored incoming messages may be displayed until the current position corresponds to an unfamiliar road segment and the current velocity does not equal zero. According to still another exemplary aspect, the method may further comprise managing media playback, wherein the mobile navigation device may play media at a reduced level in response to determining that the current position associated with the mobile navigation device corresponds to an unfamiliar road segment and subsequently played at a normal level in response to updating the current position associated with the mobile navigation device and determining that the updated current position corresponds to a familiar road segment.

According to one exemplary aspect, an apparatus may comprise, among other things, a navigation fix unit configured to determine a current position fix and one or more processors configured to correlate the current position fix to a road segment and disable navigation voice assistance and a display coupled to the apparatus in response to the road segment correlated to the current position fix corresponding to a familiar road segment. Furthermore, if the familiar road segment including a final route destination, the one or more processors may automatically terminate a navigation application. Further still, in one embodiment, the apparatus may comprise a measurement engine configured to acquire one or more satellite signal measurements and a sensor data processor configured to acquire one or more motion measurements associated with the apparatus, wherein the one or more processors may be further configured to cause the measurement engine to acquire the one or more satellite signal measurements at a reduced frequency in response to the road segment correlated to the current position fix corresponding to the familiar road segment. The navigation fix unit may then advance the current position fix using the one or more motion measurements acquired via the sensor data processor, wherein the navigation voice assistance and the display may be enabled in response to a road segment correlated to the advanced position fix corresponding to an unfamiliar road segment. Likewise, the frequency at which the measurement engine acquires the one or more satellite signal measurements may be increased in response to a road segment correlated to the advanced position fix corresponding to an unfamiliar road segment.

According to another exemplary aspect, the motion measurements acquired with the sensor data processor may indicate at least a current velocity associated with the apparatus, and the apparatus may further comprise a memory configured to store a plurality of road segments that are each associated with a familiarity index based at least on how many times the road segment has been previously traversed in addition to dates or timestamps indicating when the respective road segments were traversed. For example, in one embodiment, the familiarity index may be incremented or otherwise increased each that a road segment is traversed and the familiarity index may be decremented or otherwise decreased with respect to road segments that are associated with dates or timestamps indicating that the respective road segments have not been traversed within a predetermined time period. As such, the one or more processors may determine that the road segment correlated to the current position fix corresponds to the familiar road segment in response to the familiarity index associated therewith exceeding a predetermined threshold and the current velocity not exceeding a predefined speed limit, or alternatively in response to the road segment having substantially no turns for a predefined distance and the current velocity not exceeding the predefined speed limit. Furthermore, in response to a route planning request that specifies at least a final destination, the one or more processors may determine one or more preferred road segments (e.g., road segments that were actually traversed in one or more previous routes and deviated from road segments that were initially proposed) and calculate the route to prioritize the preferred road segments and road segments having familiarity indices that exceed the predetermined threshold.

According to another exemplary aspect, the one or more processors associated with the apparatus may be further configured to detect an incoming call and determine whether to accept or reject the incoming call based on whether the road segment correlated to the current position fix corresponds to the familiar road segment or an unfamiliar road segment. For example, in one embodiment, the incoming call may be accepted if the road segment correlated to the current position fix corresponds to the familiar road segment or rejected if the road segment correlated to the current position fix corresponds to an unfamiliar road segment. In the latter case, the one or more processors may be further configured to generate an autoreply message to indicate an estimated time when the rejected incoming call will be returned based on an estimated travel time to a familiar road segment and automatically return the rejected incoming call in response to the navigation fix unit computing an updated position fix that correlates to the familiar road segment. Furthermore, the apparatus may support additional mechanisms to reduce user distraction, wherein one or more incoming messages that are received while the current position corresponds to an unfamiliar road segment may be stored in the memory and the one or more processors may cause the stored incoming messages to be shown on a display coupled to the apparatus in response to the road segment correlated to the current position fix corresponding to a familiar road segment or the current velocity equaling zero, wherein the stored incoming messages may be displayed until a road segment correlated to the current position fix corresponds to an unfamiliar road segment and the current velocity does not equal zero. In another example, the one or more processors may reduce a level used to play media via an output device coupled to the apparatus in response to the road segment correlated to the current position fix corresponding to an unfamiliar road segment and restore the level used to play the media via the output device in response to the navigation fix unit computing an updated position fix that correlates to a familiar road segment.

According to another exemplary aspect, a navigation device may comprise a display, a navigation database configured to store a plurality of road segments and associate each road segment with an index that indicates a familiarity associated therewith, and one or more processors configured to disable the display and further disable voice assistance on the navigation device in response to a current position associated with the navigation device corresponding to a familiar road segment.

According to another exemplary aspect, a computer-readable storage medium may have computer-executable instructions recorded thereon, wherein executing the computer-executable instructions on a navigation device may cause the navigation device to determine a current position associated with the navigation device, determine whether the current position associated with the navigation device corresponds to a familiar road segment, and disable voice assistance and a display on the navigation device in response to determining that the current position associated with the navigation device corresponds to the familiar road segment.

Other objects and advantages associated with the mechanisms disclosed herein to reduce power consumption and improve user experience when using a PND or other mobile device to navigate along familiar routes or road segments will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
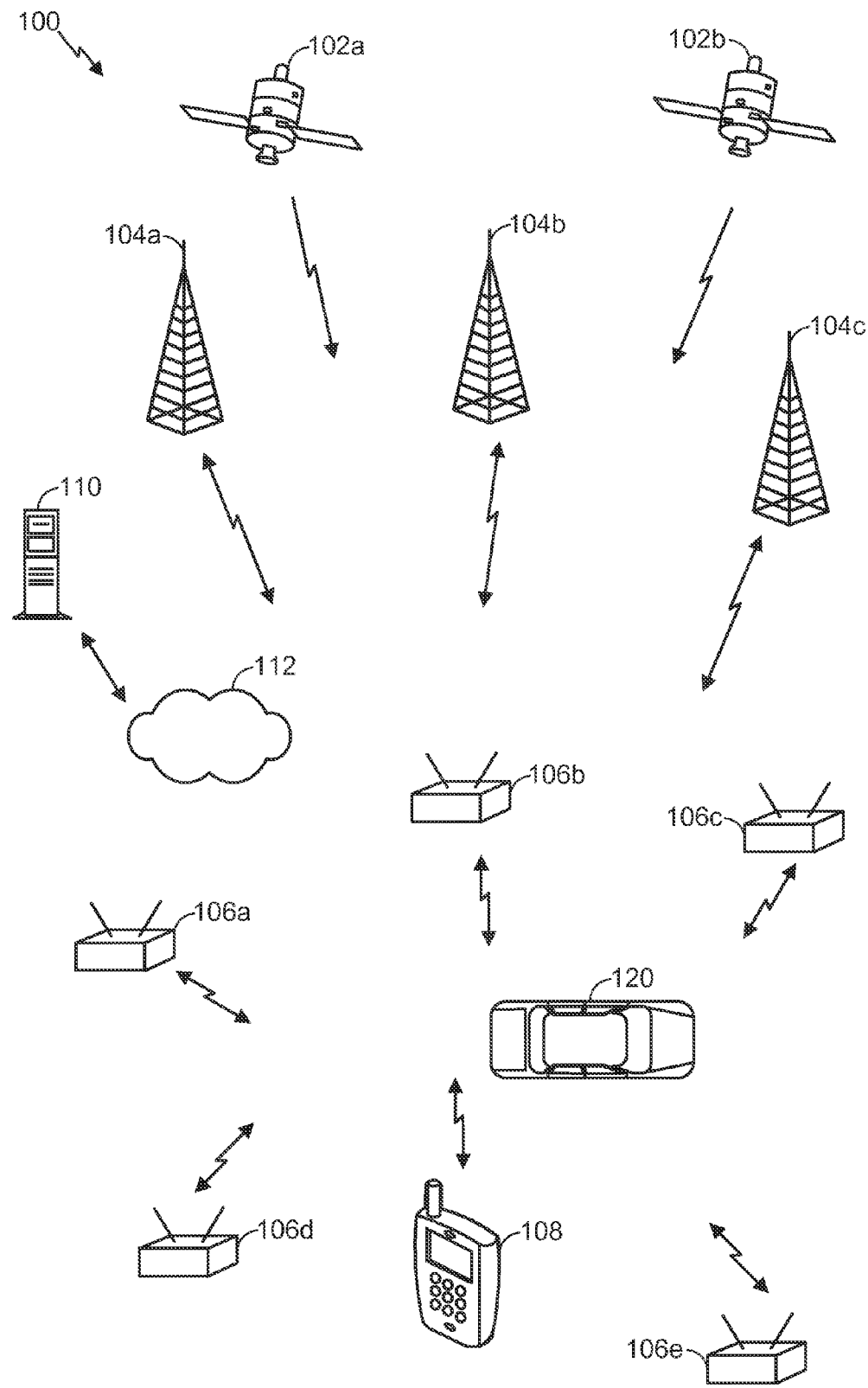
FIG. 1 illustrates an exemplary operating environment for a mobile device that can determine position using wireless techniques, according to one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

According to various aspects of the disclosure, various mechanisms described herein may reduce power consumption and improve overall user experience when navigating along familiar routes or familiar road segments using a suitable device that supports navigation features. In particular, a current position associated with the device may be determined (e.g., using one or more receivers that can acquire satellite signals, a navigation fix unit that may combine one or more location estimators to determine the current position based on satellite signals, advance a previous position fix using accelerometer, gyroscope, vehicle odometry and inertial sensor measurements, etc. according to dead reckoning techniques, etc.) and compared to a navigation map or other suitable database that associates various road segments with an index that indicates a familiarity associated therewith (e.g., a "familiarity index") based at least on how many times the road segments have been previously traversed (e.g., the familiarity index associated with a particular road segment may be incremented each time that the road segment is traversed). Furthermore, in one embodiment, the various road segments may be associated with dates, timestamps, or other historical travel data indicating when the respective road segments were traversed and the familiarity index may be decreased with respect to road segments associated with dates, timestamps, or other historical travel data indicating that the respective road segments have not been traversed within a predetermined time period. However, because a user may have more familiarity with road segments that were previously traveled relative to road segments that are entirely new, the decreased familiarity index associated with one or more road segments that have not been traveled recently may be increased more aggressively when the road segments are traveled again (e.g., restoring the familiarity index to the initial value that existed prior to the decreasing or incrementing the familiarity index according to an increased factor in response to the user traversing the road segment again, traversing the road segment a threshold number of times within a certain time period, etc.).

According to various aspects of the disclosure, to determine whether the current position associated with the device corresponds to a familiar road segment, the current position may be correlated to a particular road segment and determined to correspond to a familiar road segment if the road segment correlated to the current position has an index that exceeds the familiarity threshold and a current velocity associated with the device not does not exceed a predefined speed limit. Alternatively, even if the road segment correlated to the current position has an index that does not exceed the predetermined familiarity threshold, the current position may be determined to correspond to a familiar road segment if the road segment correlated to the current position is substantially straight (e.g., has substantially no turns for a predefined threshold distance) and the current velocity does not exceed the predefined speed limit. In contrast, the current position may be determined to not correspond to a familiar road segment if the road segment correlated to the current position has an index that does not exceed the familiarity threshold and is not considered substantially straight (e.g., has one or more turns, has substantially no turns but is shorter than the threshold distance, etc.), or alternatively if the current velocity exceeds the predefined speed limit even if the road segment correlated has an index that exceeds the familiarity threshold and/or the road segment is considered substantially straight (i.e., the speed limit may provide a filter to ensure that the functions performed on familiar road segments are not invoked at high speeds and thereby ensure that the user focuses on driving while traveling at high speeds).

According to various aspects of the disclosure, the mechanisms described herein to reduce power consumption and improve overall user experience based on whether the current position corresponds or does not correspond to a familiar road segment may include disabling voice assistance and a display in response to the current position corresponding to a familiar road segment. Furthermore, a frequency at which a receiver acquires one or more satellite signals to determine the current position may be reduced if the current position corresponds to a familiar road segment, in which case signals or other measurements acquired from one or more inertial sensors may be used to advance the current position according to dead reckoning techniques. Furthermore, the voice assistance and/or the display may be subsequently enabled (if currently disabled) in response to the advanced current position corresponding to an unfamiliar road segment and in a similar respect, the frequency at which the receiver acquires satellite signals may be increased if the advanced current position corresponds to an unfamiliar road segment. Moreover, a navigation application executing on the device may be automatically terminated or otherwise exited if the current position corresponds to a familiar road segment and the familiar road segment includes a final route destination. Furthermore, media may be played via the device at a reduced level if the current position corresponds to an unfamiliar road segment the media may subsequently be played at a normal level or the previous level when the road segment correlated to the current position changes to a familiar road segment.

According to various aspects of the disclosure, the mechanisms described herein to reduce power consumption and improve overall user experience based on whether the current position corresponds or does not correspond to a familiar road segment may further include planning routes based on historical travel data. For example, in one embodiment, calculated or proposed routes may be compared to routes that are actually traversed, whereby road segments that are actually traversed may be prioritized over road segments in the calculated or proposed routes that were avoided or otherwise untraveled. Accordingly, in one embodiment, in response to a request to plan a route, which may include at least a final route destination, preferred road segments that include road segments having familiarity indices that exceed the above-mentioned familiarity threshold and/or road segments that were traversed in one or more previous routes and did not match road segments included in the routes that were initially calculated or proposed may be determined, whereby the route may be calculated to prioritize the preferred road segments based on previous route deviations and familiar road segments based on the familiarity indices associated therewith.

According to various aspects of the disclosure, the mechanisms described herein to reduce power consumption and improve overall user experience based on whether the current position corresponds or does not correspond to a familiar road segment may further include various functions to ensure that users focus on navigation tasks having a high priority when traveling on unknown road segments or road segments that have substantial turns or other spatial characteristics that may require focused attention on driving over other non-navigation tasks and further to provide more contextually-relevant call and message handling functions. For example, an incoming call may be accepted if the current position corresponds to a familiar road segment or alternatively rejected if the current position corresponds to an unfamiliar road segment. In the latter case, an autoreply message may be generated to indicate an estimated time when the rejected call will be returned based on an estimated travel time from the current position to a familiar road segment. As such, in response to the road segment correlated to the current position subsequently changing to a familiar road segment, the incoming call that was rejected may be automatically returned. In a similar respect, one or more incoming messages (e.g., text messages, location-based advertisements, etc.) that are received while the current position corresponds to an unfamiliar road segment may be stored and subsequently displayed when the current position corresponds to a familiar road segment until the current position changes to an unfamiliar road segment. Alternatively, the stored incoming messages may be displayed when a current velocity equals zero and continue to be displayed until the current velocity does not equal zero (e.g., displaying the stored messages while stopped, such as at a red light or in heavy traffic, and ceasing to display the stored messages when travel resumes).

More particularly, according to one aspect of the disclosure, FIG. 1 illustrates an exemplary operating environment 100 for a mobile device 108 having wireless positioning capabilities. For example, embodiments may be directed to a mobile device 108 that can determine a position associated therewith based upon round trip time (RTT) measurements and/or other measurements that may be adjusted to accommodate for processing delays introduced by wireless access points. The processing delays may vary among different access points and may also change over time. By using information from a motion sensor, the mobile device 108 may calibrate out the effects of the processing delays introduced by the wireless access points. The operating environment 100 may contain one or more different types of wireless communication systems and/or wireless positioning systems. In the embodiment shown in FIG. 1, one or more Satellite Positioning System (SPS) satellites 102a, 102b may be used as an independent source of position information for the mobile device 108, which may include one or more dedicated SPS receivers specifically designed to receive signals for deriving geo-location information from the SPS satellites.

The operating environment 100 may also include one or more Wide Area Network Wireless Access Points (WAN-WAPs) 104a, 104b, 104c, which may be used for wireless voice and/or data communication, and as another source of independent position information for the mobile device 108. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components, which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, 106d, 106e, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106a-106e may be part of, for example, Wi-Fi networks (802.11x), cellular piconets and/or femtocells, Bluetooth networks, etc.

The mobile device 108 may derive position information from any one or more of the SPS satellites 102a, 102b, the WAN-WAPs 104a-104c, and/or the LAN-WAPs 106a-106e. Each of the aforementioned systems can provide an independent estimate of the position for the mobile device 108 using different techniques. In some embodiments, the mobile device 108 may combine the solutions derived from each of the different types of access points to improve the accuracy of the position data. When deriving position using the SPS satellites 102a, 102b, the mobile device 108 may utilize a receiver specifically designed for use with the SPS that extracts position, using conventional techniques, from a plurality of signals transmitted by SPS satellites 102a, 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass, Beidou, etc. may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons, or other enclosed areas. Another implementation of pseudolites is known as radio beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile device 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular networks may include additional base stations or other resources that may not be shown in FIG. 1. While WAN-WAPs 104a-104c may actually be moveable or otherwise capable of being relocated, for illustration purposes it will be assumed that they are essentially arranged in a fixed position.

The mobile device 108 may perform position determination using known time-of-arrival (TOA) techniques such as, for example, Advanced Forward Link Trilateration (AFLT). In other embodiments, each WAN-WAP 104a-104c may comprise a WiMAX wireless networking base station. In this case, the mobile device 108 may determine its position using TOA techniques from signals provided by the WAN-WAPs 104a-104c. The mobile device 108 may determine positions either in a stand-alone mode, or using the assistance of a positioning server 110 and network 112 using TOA techniques, as will be described in more detail below. Furthermore, various embodiments may have the mobile device 108 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the mobile device 108 may be able to exploit the signals from each different type of WAN-WAP 104a-104c, and further combine the derived position solutions to improve accuracy.

When deriving position using the WLAN, the mobile device 108 may utilize TOA techniques with the assistance of the positioning server 110 and the network 112. The positioning server 110 may communicate to the mobile device 108 through network 112. Network 112 may include a combination of wired and wireless networks, which incorporate the LAN-WAPs 106a-106e. In one embodiment, each LAN-WAP 106a-106e may be, for example, a Wi-Fi wireless access point, which is not necessarily set in a fixed position and can change location. The position of each LAN-WAP 106a-106e may be stored in the positioning server 110 in a common coordinate system. In one embodiment, the position of the mobile device 108 may be determined by having the mobile device 108 receive signals from each LAN-WAP 106a-106e. Each signal may be associated with its originating LAN-WAP based upon some form of identifying information that may be included in the received signal (such as, for example, a MAC address). The mobile device 108 may then sort the received signals based upon signal strength, and derive the time delays associated with each of the sorted received signals. The mobile device 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106e, of the mobile device 108. The positioning server 110 may generate and provide a Location Configuration Indication (LCI) message to the mobile device 108 that includes a pointer to the position of the mobile device 108 in a local coordinate system. The LCI message may also include other points of interest in relation to the location of the mobile device 108. When computing the position of the mobile device 108, the positioning server 110 may take into account the different delays, which can be introduced by elements within the wireless network.

The position determination techniques described herein may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

Furthermore, in one embodiment, the mobile device 108 may be suitably linked to a vehicle 120 through one or more communication interfaces (e.g., a Bluetooth interface, an RF antenna, a wired connection, etc.) that enable the mobile device 108 to read an odometer value and other vehicle odometry and inertial sensor (VOIS) measurements from the vehicle 120. For example, as will be described in further detail below, the mobile device 108 may use the odometer value read from the vehicle 120 (e.g., a cumulative odometer value stored on the vehicle 120 via electronic, mechanical, or other means) to determine changes in distance and reveal the total distance traveled in the vehicle 120, which may be used to quickly initialize various parameters that may be used to derive an estimated initial position, velocity, and heading that can be used to support navigation in the vehicle 120. Furthermore, an application program interface (API) that supports communication between the mobile device 108 and the vehicle 120 may make the odometer value available to the mobile device 108 even if the vehicle 120 has been shut off and left for a substantial time period. Accordingly, the mobile device 108 may store an association between the last known position and navigation state associated with the vehicle 120 at a given odometer value (e.g., at the last time that the mobile device 108 was linked to the vehicle 120), or the mobile device 108 may alternatively obtain the last known position and navigation state associated with the odometer value from the positioning server 110 or another suitable device or database that stores the association, wherein the mobile device 108 may then use the last known position and navigation state to estimate an initial position and navigation state associated with the vehicle 120.

Figure 2:
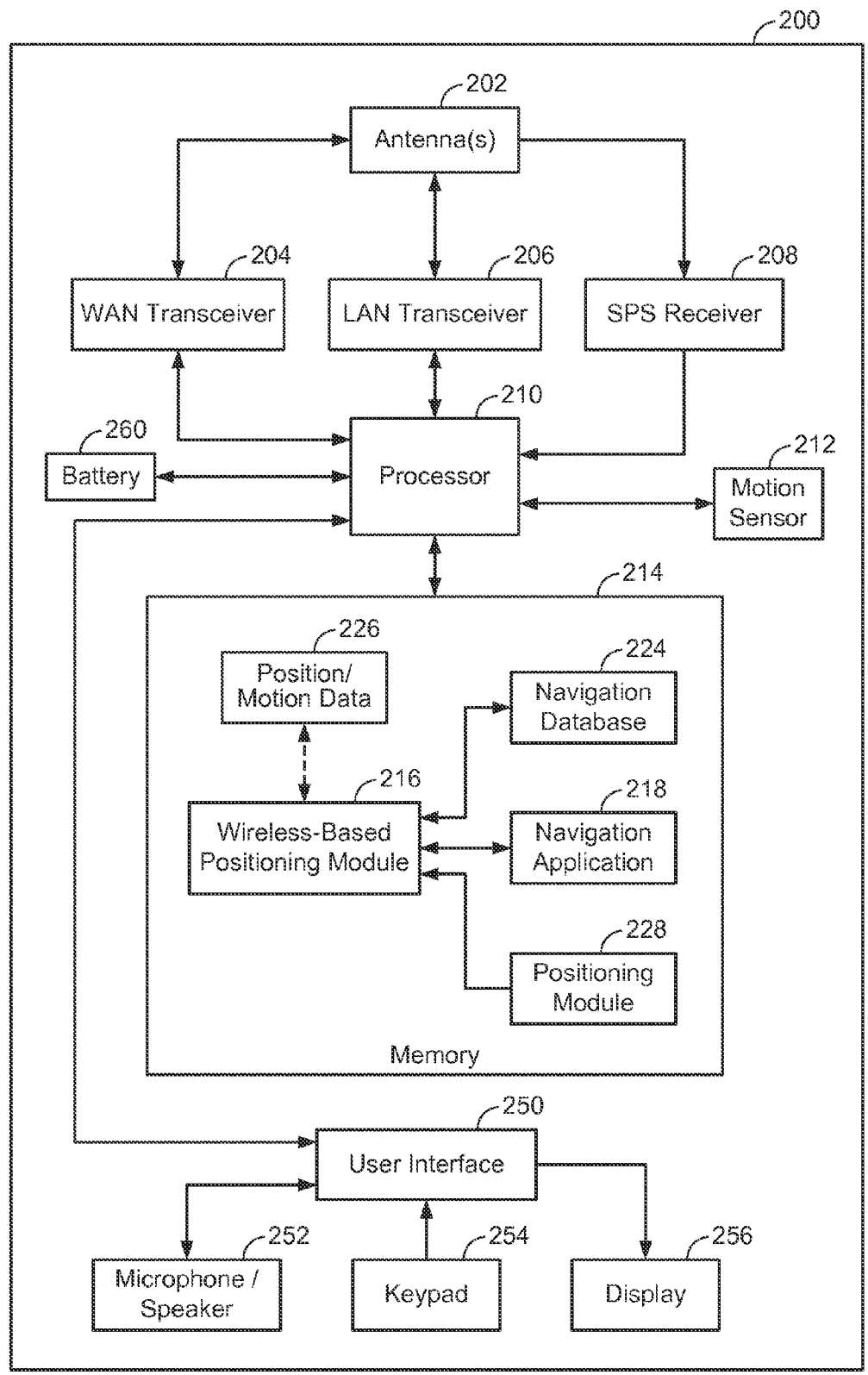
FIG. 2 illustrates an exemplary mobile device that may be used in an operating environment that can determine position using wireless techniques, according to one aspect of the disclosure.

FIG. 2 is a block diagram illustrating various components of an exemplary mobile device 200. For the sake of simplicity, the various features and functions illustrated in the box diagram of FIG. 2 are connected together using a common bus, which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile device 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs 104a-104c, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 200 may also include one or more local area network (LAN) transceivers 206 that may be connected to one or more antennas 202. The LAN transceiver 206 comprises suitable devices, hardware, and/or software for communicating with and/or detecting signals to/from LAN-WAPs 106a-106e, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal areanetwork, (e.g., Bluetooth). Additionally, any other type of wireless networking technologies may be used, for example, Ultra Wide Band, ZigBee, wireless USB, etc.

As used herein, the abbreviated term "wireless access point" (WAP) may be used to refer to LAN-WAPs 106a-106e and/or WAN-WAPs 104a-104c. Specifically, in the description presented below, when the term "WAP" is used, it should be understood that embodiments may include a mobile device 200 that can exploit signals from a plurality of LAN-WAPs 106a-106e, a plurality of WAN-WAPs 104a-104c, or any combination of the two. The specific type of WAP being utilized by the mobile device 200 may depend upon the environment of operation. Moreover, the mobile device 200 may dynamically select between the various types of WAPs in order to arrive at an accurate position solution. In other embodiments, various network elements may operate in a peer-to-peer manner, whereby, for example, the mobile device 200 may be replaced with the WAP, or vice versa. Other peer-to-peer embodiments may include another mobile device (not shown) acting in place of one or more WAP.

An SPS receiver 208 may also be included in the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile device's 200 position using measurements obtained by any suitable SPS algorithm.

A motion sensor 212 may be coupled to a processor 210 to provide movement and/or orientation information, which is independent of motion data derived from signals, received by the WAN transceiver 204, the LAN transceiver 206 and the SPS receiver 208.

By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile device 200. The memory 214 may be on-board the processor 210 (e.g., within the same IC package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, a navigation application 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the mobile device 200. Furthermore, in one embodiment, a battery 260 may be coupled to the processor 210, wherein the battery 260 may supply power to the processor 210 and various other modules and components located on the mobile device 200 through appropriate circuitry and/or under control of the processor 210.

The navigation application 218 may be a process running on the processor 210 of the mobile device 200, which requests position information from the wireless-based positioning module 216. Applications typically run within an upper layer of the software architectures, and may include Indoor Navigation, Buddy Locator, Shopping and Coupons, Asset Tracking, and Location Aware Service Discovery. The wireless-based-positioning module 216 may derive the position of the mobile device 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in memory 214 in the position/motion data module 226. In other embodiments, the motion sensor 212 may provide data, which should be further processed by processor 210 to derive information to perform the calibration. For example, the motion sensor 212 may provide acceleration and/or orientation data (single or multi-axis) which can be processed using positioning module 228 to derive position data for adjusting the processing delays in the wireless-based positioning module 216.

After calibration, the position may then be output to the navigation application 218 in response to its aforementioned request. In addition, the wireless-based positioning module 216 may utilize a navigation database 224 for exchanging operational parameters. Such parameters may include the determined processing delays for each WAP, the WAPs positions in a common coordinate frame, various parameters associated with the network, initial processing delay estimates, etc. In addition, the navigation database 224 may include one or more maps that include various road segments, wherein the navigation database 224 may associate each road segment with an index or other information to identify the particular road segment, a start position and an end position (e.g., expressed using GPS coordinates or other suitable data), and/or additional information that may be relevant to a navigation context (e.g., a speed limit).

In other embodiments, the additional information may optionally include auxiliary position and/or motion data, which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the mobile device 200 operates. For example, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., AFLT within a CDMA network). In certain implementations, the motion sensor 212 and/or the SPS receiver 208 may provide all or part of the auxiliary position/motion data 226 without further processing by the processor 210. In some embodiments, the auxiliary position/motion data 226 may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the navigation application 218 may be provided in firmware. Additionally, while in this example the wireless-based positioning module 216 and the navigation application 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the mobile device.

The mobile device 200 may include a user interface 250, which provides any suitable interface systems, such as a microphone/speaker 252, keypad 254, and display 256 that allows user interaction with the mobile device 200. The microphone/speaker 252 provides for voice communication services using the WAN transceiver 204 and/or the LAN transceiver 206. The keypad 254 comprises any suitable buttons for user input. The display 256 comprises any suitable display, such as, for example, an LCD display, and may further include a touch screen display for additional user input modes.

As used herein, the mobile device 108 and/or mobile device 200 may be any portable or movable device or machine that is configurable to acquire wireless signals transmitted from, and transmit wireless signals to, one or more wireless communication devices or networks. As shown in FIG. 1 and FIG. 2, the mobile device 108 and/or mobile device 200 may be representative of such a portable wireless device. Thus, by way of example but not limitation, the mobile device 108 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device, which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 3:
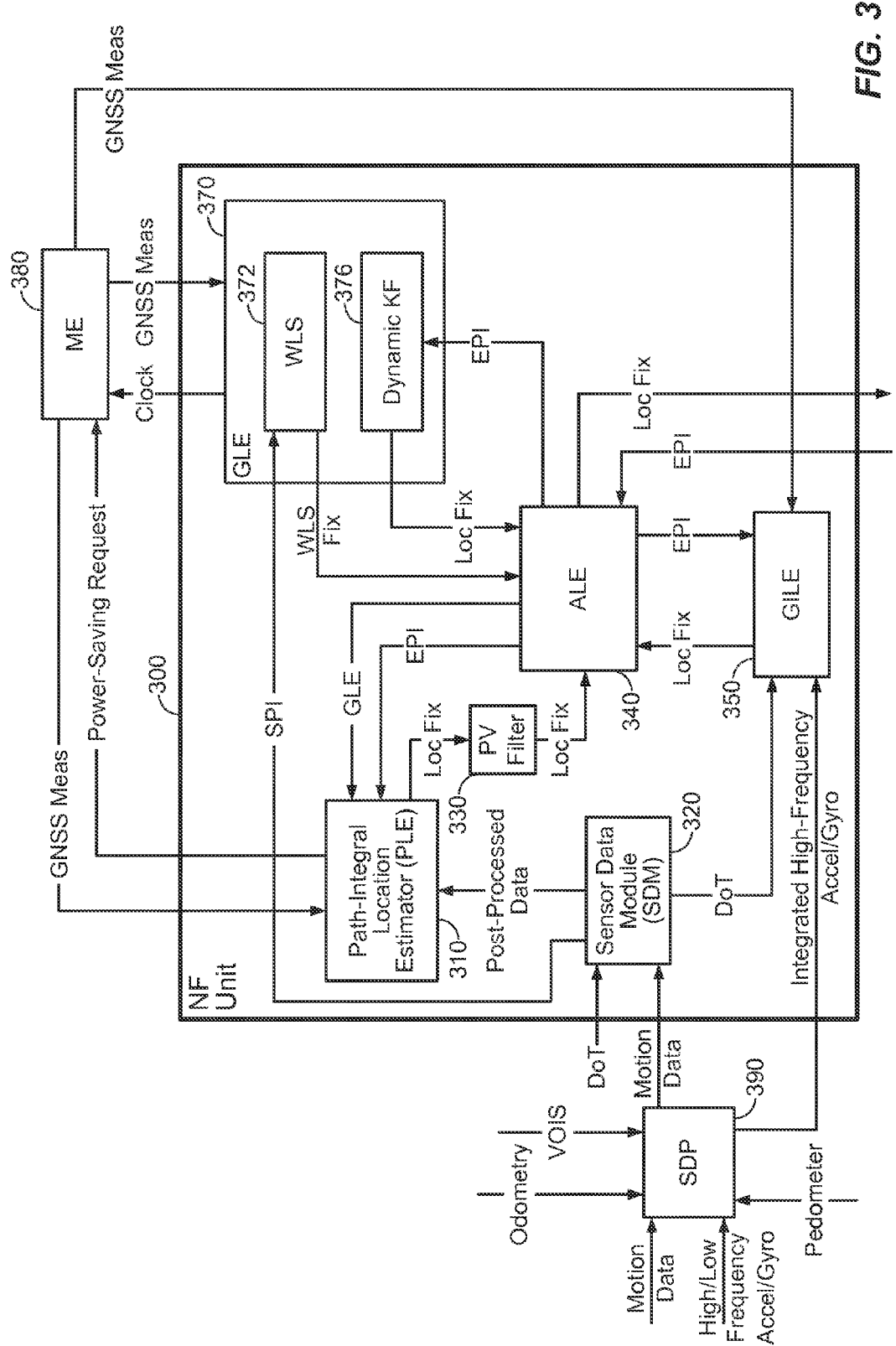
FIG. 3 illustrates an exemplary sensor-assisted navigation system that may be used to initialize a navigation position and state, according to one aspect of the disclosure.

According to one aspect of the disclosure, FIG. 3 illustrates an exemplary sensor-assisted navigation (SAN) system that may be used to initialize a navigation position and state, wherein the SAN system shown therein may generally include a navigation fix (NF) unit 300, a measurement engine (ME) 380 that may communicate with the NF unit 300, and a sensor data processor (SDP) 390 that may further communicate with the NF unit 300. In one embodiment, the NF unit 300 may be a composite of several location estimators, which may include a path-integral location estimator (PLE) 310, a sensor data module (SDM) 320, a position velocity (PV) filter 330 (e.g., a cascade filter that may be applied to position, velocity, and/or other location fix outputs from the PLE 310 to further refine and smooth a navigation result), an aggregator location estimator (ALE) 340, a GNSS inertial navigation system (GNSS-INS) location estimator (GILE) 350, and a GNSS location estimator (GLE) 370.

As shown in FIG. 3, the SDP 390 may communicate with the outside world and receive sensor and other data (e.g., telematics sourced from a vehicle). For example, in one embodiment, the SDP 390 may receive VOIS measurements, motion data, high and low frequency accelerometer and gyroscope signals, pedometer signals, telematics data, or other suitable sensor data and provide a "front-end" to the NF unit 300. Furthermore, the SDP 390 may establish time synchronization between incoming data and GPS time and then assign GPS timestamps to the incoming data, which may comprise direction of travel (DoT) data and motion data that the SDP 390 forwards to the SDM 320 for storage and processing and/or integrated high frequency accelerometer and gyroscope data that the SDP 390 forwards to the GILE 350 for storage and processing. The SDM 320 receives the timestamped data from the SDP 390, computes derived quantities, and buffers and distributes such data inside the NF unit 300 (e.g., to the GLE 370, the PLE 310, the GILE 350, etc.).

For example, as further shown in FIG. 3, the SDM 320 may distribute post-processed data to the PLE 310, which may use the post-processed data in combination with GNSS measurements received from the ME 380 and GLE 370 and External Position Injection (EPI) data received from the ALE 340 to compute a location fix. The PLE 310 may provide the location fix to the PV filter 330, which may apply the cascade filter mentioned above to refine the location fix computed in the PLE 310 and then provide the refined location fix to the ALE 340. Furthermore, the SDM 320 may provide a Stationary Position Indicator (SPI) to the GLE 370, which may include a weighted least squares (WLS) module 372 that may use the SPI in combination with GNSS measurements received from the ME 380 to compute a WLS fix that may be back to the ALE 340 and used to perform a divergence check associated with the location fix computed in the PLE 310 based on the refined location fix received from the PV filter 330. For example, in one embodiment, the divergence check may include the PLE 310 obtaining the WLS fix for a current epoch from the ALE 340 and comparing the WLS fix for the current epoch to the location fix produced therein. As such, in response to detecting a divergence between the WLS fix obtained from the ALE 340 and the location fix produced in the PLE 310, the divergence check may result in resetting the PLE 310 to an uninitialized state. In addition, the GLE 370 may include a dynamic Kalman Filter (KF) 376 that may receive the EPI data from the ALE 340 and compute a location fix that may be used an input to the ALE 340 to support detecting a stationary or non-stationary user and/or to perform a second divergence check. For example, in one embodiment, the second divergence check may compare the location fix received from the PLE 310 (via the PV filter 330) with the location fix received from the dynamic KF 376 in the GLE 370 to detect divergence associated with the location fix computed in the PLE 310, wherein if the ALE 340 detects a divergence between the location fix computed in the PLE 310 and the location fix that the dynamic KF filter 376 computed, the ALE 340 may reset the PLE 310 to the location fix computed with the dynamic KF 376 in the GLE 370.

In one embodiment, the SAN system may further support dead reckoning techniques to advance a previous location fix (e.g., a previous location fix output from the ALE 340) according to known or estimated velocities and headings using data obtained from inertial sensors (e.g., the DoT, motion data, and integrated high-frequency accelerometer and gyroscope data output from the SDP 390). As such, the dead reckoning techniques may generally advance the previous location fix to calculate a current position and heading that support navigation from the previous location fix, which may reduce a need to acquire a current location fix from the ALE 340 or other components that receive or otherwise acquire GNSS signals because vehicle odometry, modeled vehicle dynamics, or other suitable vehicle parameters that support dead reckoning may be used to advance the previous location fix without having to utilize the ALE 340 or the other components that require GNSS signal measurements while providing the appearance of an always-available position to the user.

Figure 4A:
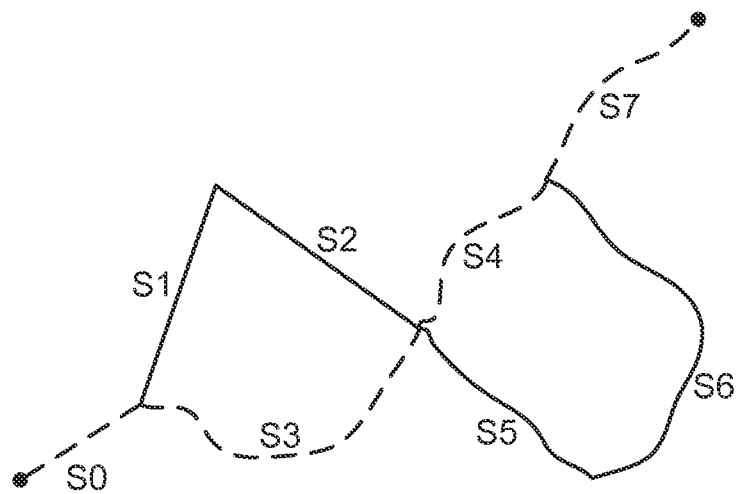
FIGS. 4A-B illustrate an exemplary road segment database that may track information associated with traveled road segments to provide information that can be used to determine familiar road segments, according to one aspect of the disclosure.
Figure 4B:
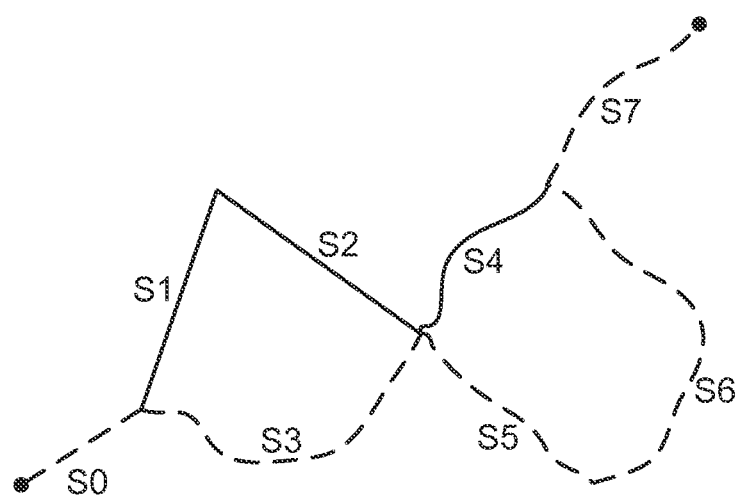

According to one aspect of the disclosure, FIGS. 4A-B illustrate an exemplary road segment database 400 that may track information associated with traveled road segments to provide information that can be used to determine familiar road segments. In particular, as mentioned above, a navigation database typically includes one or more maps having various road segments that are each associated with an index or other information to identify the particular road segment, a start position and an end position (e.g., expressed using GPS coordinates or other suitable data), and/or additional information that may be relevant to a navigation context (e.g., a speed limit). In one embodiment, in order to track information associated with traveled road segments and thereby provide information that can be used to determine familiar road segments, the road segment database 400 shown in FIGS. 4A-B may comprise an extension to typical navigation databases, wherein the road segment database 400 may associate each road segment with an appropriate identifier 410, dates or timestamps 420 that indicate when each road segment was previously and/or most recently traveled, and a traveled index 430 that indicates how many times each road segment was previously traveled. Accordingly, as will be described in further detail herein, each time that a user travels on a particular route, the traveled index 430 associated with the road segments that are traveled may be incremented accordingly, whereby road segments may be considered "familiar" once the traveled index 430 reaches an appropriate threshold value, which may be predefined or configurable in various ways that will be described in further detail below (e.g., the timestamp field 420 may be used in combination with the traveled index 430 to configure the familiarity threshold, whereby if a user has driven a certain route many times before, but not very recently, a larger threshold may be used initially while the user re-acquaints themselves with the route and the threshold may be subsequently reduced after only one or two recent re-tracings to reflect that the relearning period will be much shorter than an initial learning phase). In other words, the traveled index 430 generally tracks how many times the user has traveled on each road segment. For example, referring to FIG. 4A, suppose that a user drives along a route that includes road segments S0, S3, S4, and S7 (as indicated by the dashed lines) on Feb. 25, 2013. In response thereto, the road segment database 400 may be appropriately updated to include a Feb. 25, 2013 traveled date in the timestamp field 420 associated with road segments S0, S3, S4, and S7, and the traveled index 430 associated with road segments S0, S3, S4, and S7 may all be incremented. Referring now to FIG. 4B, suppose that the user drives along a similar route the next day, except that the route traveled on the next day includes road segments S0, S3, S5, S6, and S7. In response thereto, the road segment database 400 may be appropriately updated to include a Feb. 26, 2013 traveled date in the timestamp field 420 associated with road segments S0, S3, S5, S6, and S7, and the traveled index 430 associated with road segments S0, S3, S5, S6, and S7 may all be incremented. Accordingly, if the "familiarity" threshold value is 2, road segments S0, S3, and S7 may be considered "familiar" road segments following the trip on Feb. 26, 2013.

Accordingly, in one embodiment, the road segment database 400 shown in FIG. 4 may generally log each instance when a particular road segment has been traversed and take one or more appropriate actions in response to correlating a current location or position fix to a familiar road segment. For example, in one embodiment, voice assistance and a display may be turned off or temporarily disabled when the current location corresponds to a familiar road segment, thereby improving user experience because many users may find voice assistance annoying and not particularly useful when traveling on known roads. Moreover, turning off or temporarily disabling voice assistance and the display on familiar road segments may reduce battery consumption because resources needed to generate voice and display outputs may be preserved. Furthermore, in one embodiment, the navigation application can be automatically exited if the current location correlates to a known road segment and further contains the destination point, which may similarly improve user experience and reduce battery consumption because all resources that the navigation application consumes can be preserved. Further still, in one embodiment, the familiar road segments may be leveraged to dynamically optimize power consumption, because a receiver does not need to calculate an updated position fix at the default frequency (e.g., once per second) when the user enters a journey leg that includes one or more familiar road segments. In particular, the user may be less likely to take a wrong turn or become confused if the position marked on the route map does not precisely match the actual position when traveling on a familiar road segment, whereby the receiver can switch to calculating and reporting a position fix to the navigation application at a reduced frequency (e.g., every five seconds, every ten seconds, or at longer intervals) and dead reckoning may be used to produce the remaining position fixes based on vehicle odometry and inertial sensor (VOIS) measurements, which may substantially reduce power consumption when retracing familiar road segments.

Figure 5A:
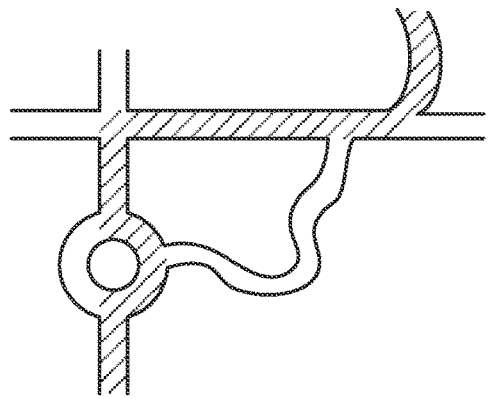
FIGS. 5A-C illustrate an exemplary route that may be dynamically adapted to reflect familiar road segments and driving patterns learned from prior user behavior, according to one aspect of the disclosure.
Figure 5B:
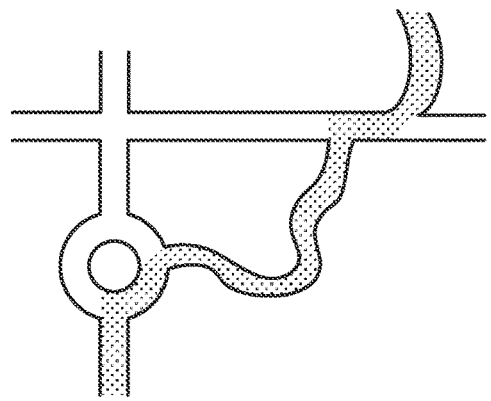
Figure 5C:
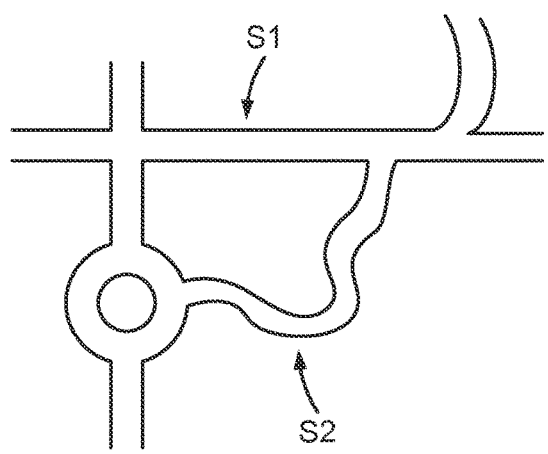

Further still, because certain users may have more confidence or otherwise prefer to drive along previously traveled road segments rather than new paths, the navigation application may be configured to prioritize familiar or preferred route segments when computing routes. For example, according to one aspect of the disclosure, FIGS. 5A-C illustrate an exemplary route that may be dynamically adapted according to route calculation logic that may prioritize familiar or preferred road segments and learn driving patterns based on prior user behavior. More particularly, existing navigation devices typically calculate a route based on factors such as shortest distance, least time (e.g., use motorways rather than back roads), fuel consumption, live traffic, or other data that may not depend on or otherwise adapt to actual user behavior. On the other hand, the road segment database 400 shown in FIGS. 4A-B may be used to compute a route that prioritizes road segments that the user has already traveled and thereby allow the user to drive more confidently because the user may prefer and/or already know the road segments and typical conditions on the road segments. For example, FIG. 5A shows an initial route that a PND may propose in response to a user requesting a route from point A to B, while FIG. 5B shows an exemplary route that the user may actually traverse from point A to point B one or more times following the PND proposing the route shown in FIG. 5A. Accordingly, as shown in FIG. 5C, the proposed route shown in FIG. 5A may differ from the actual route shown in FIG. 5B in that the proposed route includes road segment S1 whereas the actual route includes road segment S2, whereby the actual user behavior may result in road segment S2 having a higher priority than road segment S1 when subsequently calculating routes that may include one road segment or the other. For example, in one embodiment, road segment S2 may have higher priority than road segment S1 in response to the user ignoring the proposed route shown in FIG. 5A and instead taking the route shown in FIG. 5B a number of times that exceeds a certain threshold (e.g., three times).

Figure 6:
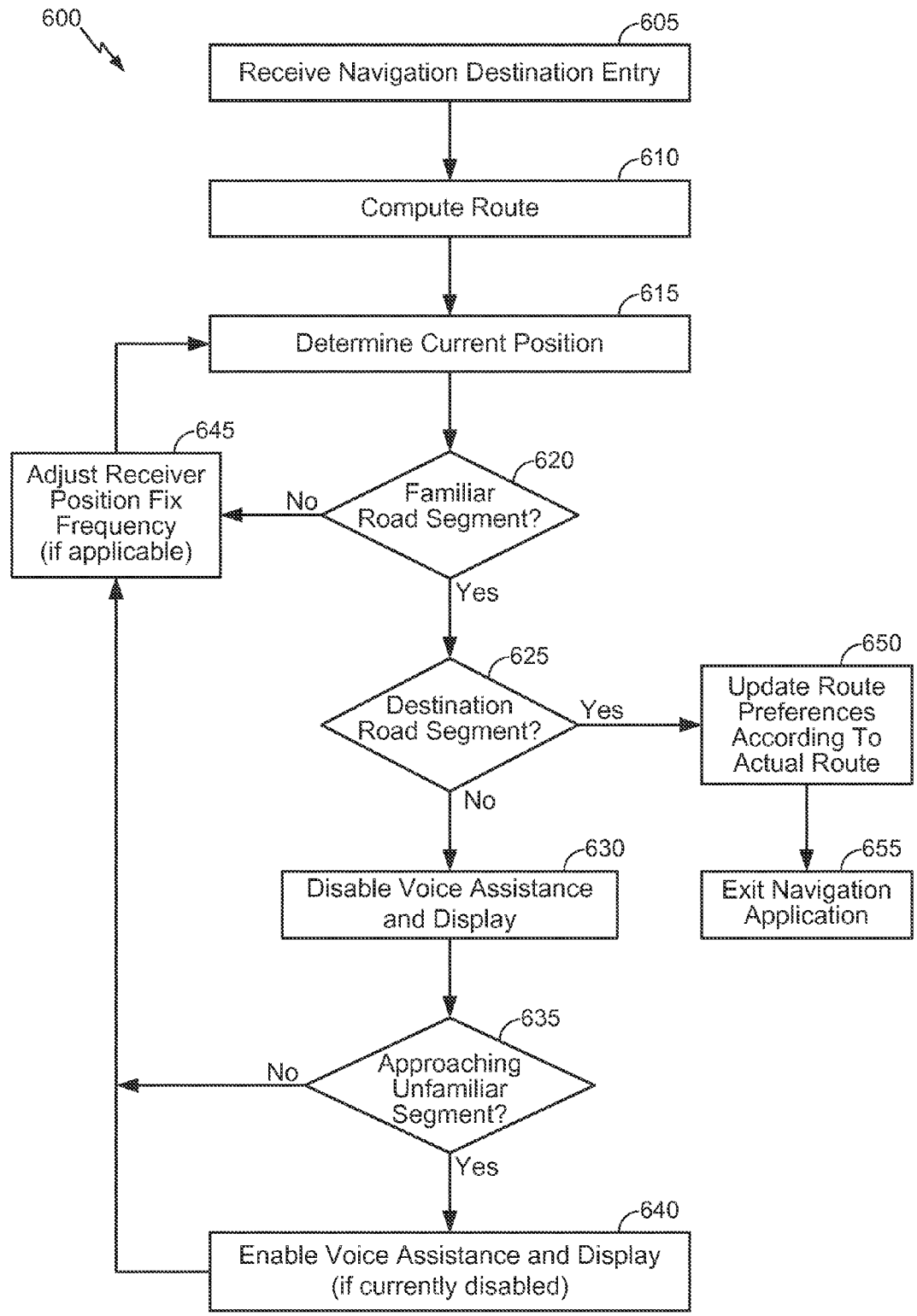
FIG. 6 illustrates an exemplary method to reduce power consumption and improve overall user experience when using a personal navigation device (PND) or other mobile device to navigate along familiar routes or familiar road segments, according to one aspect of the disclosure.

According to one aspect of the disclosure, FIG. 6 illustrates an exemplary method 600 to reduce power consumption and improve overall user experience when using a personal navigation device (PND) or other mobile device (hereinafter referred to generically as "mobile navigation device") to navigate along familiar routes or familiar road segments. More particularly, in response to receiving a navigation destination entry at block 605, the mobile navigation device may compute a route from a current location to the navigation destination entry at block 610. For example, referring to FIG. 5A, the navigation destination entry received at block 605 may identify location B and the route computed at block 610 may comprise the proposed route from location A to location B. Alternatively, as will be discussed in further detail below, the mobile navigation device may learn from past user behavior wherein the proposed route shown in FIG. 5A may have been ignored one or more times and the route shown in FIG. 5B may have been taken instead, in which case the route computed at block 610 may comprise the route from location A to location B as shown in FIG. 5B.

In one embodiment, in response to suitably calculating the route, the mobile navigation device may then determine a current position fix at block 615. For example, in one embodiment, the current position fix may be obtained using one or more GNSS signals that are acquired using a GPS receiver, using one or more vehicle odometry and inertial sensor (VOIS) measurements to advance a previous position fix that was obtained using the GPS receiver via dead reckoning techniques, or any suitable combination thereof In any case, the mobile navigation device may then correlate the current position fix to a road segment and determine whether the road segment correlated to the current position fix corresponds to a familiar road segment at block 620. For example, various techniques that may be used to determine whether or not a particular road segment may be considered "familiar" will be described in further detail below with reference to FIG. 7.

In response to a determination that the current position fix corresponds to a familiar road segment, at block 625, the mobile navigation device may then determine whether the current (familiar) road segment includes the final destination that was entered at block 605, in which case the mobile navigation device may update one or more route preferences at block 650 according to the actual route that was traveled to the destination. For example, in one embodiment, the mobile navigation device may note whether the actual route that was taken did not match the initially calculated route (e.g., due to driver knowledge about conditions along the respective routes or personal preferences, such as to avoid traffic signals or left-hand turns). As such, if the actual route that was taken did not match the initially calculated route, the mobile navigation device may increment a counter associated with the actual route and/or road segments associated with the actual route at block 650, whereby subsequent routes that are calculated at block 610 may prioritize the actual route over any default route that was not taken, road segments that were taken in the actual route over any road segments in the default route that were avoided, etc. Furthermore, in response to block 625 resulting in a determination that the current (familiar) road segment includes the final destination, the mobile navigation device may exit the navigation application entirely at block 655.

In one embodiment, in response to determining that the current position fix corresponds to a familiar road segment at block 620 and further determining that the current (familiar) road segment does not include the final destination, the mobile navigation device may disable voice assistance and a display at block 630. In this manner, voice assistance that may not be considered useful when driving along familiar routes may be disabled and a display that may present information having little value may be disabled in order to reduce battery consumption that would otherwise be required to drive the voice assistance and display outputs. However, in one embodiment, the mobile navigation device may further determine whether an unfamiliar road segment may be approaching at block 635, in which case the voice assistance and display may be enabled at block 640 (e.g., if the voice assistance and display were previously disabled, otherwise block 640 may result in not performing the disabling that would otherwise have been performed at block 630). Furthermore, in one embodiment, the mobile navigation device may adjust a frequency at which the receiver obtains GPS signals to update any previous position fixes at bloc 645. For example, when the user enters a familiar road segment on the route to the final destination, the receiver does not need to calculate a position fix at the regular frequency and can instead be switched to calculating and reporting a position fix at a reduced frequency with dead reckoning being used to compute the remaining position fixes based on VOIS measurements (e.g., because the user may be less likely to make a wrong turn or become confused if the current position shown on a map does not exactly match the actual position). In the alternative, upon approaching or otherwise entering a familiar road segment, the frequency at which the receiver acquires position fixes may be increased at block 645 in response to determining that an unfamiliar road segment may be approaching because the user may be more likely to make wrong turns or need more accuracy in the position data shown on the map when traveling on unfamiliar road segments.

Figure 7:
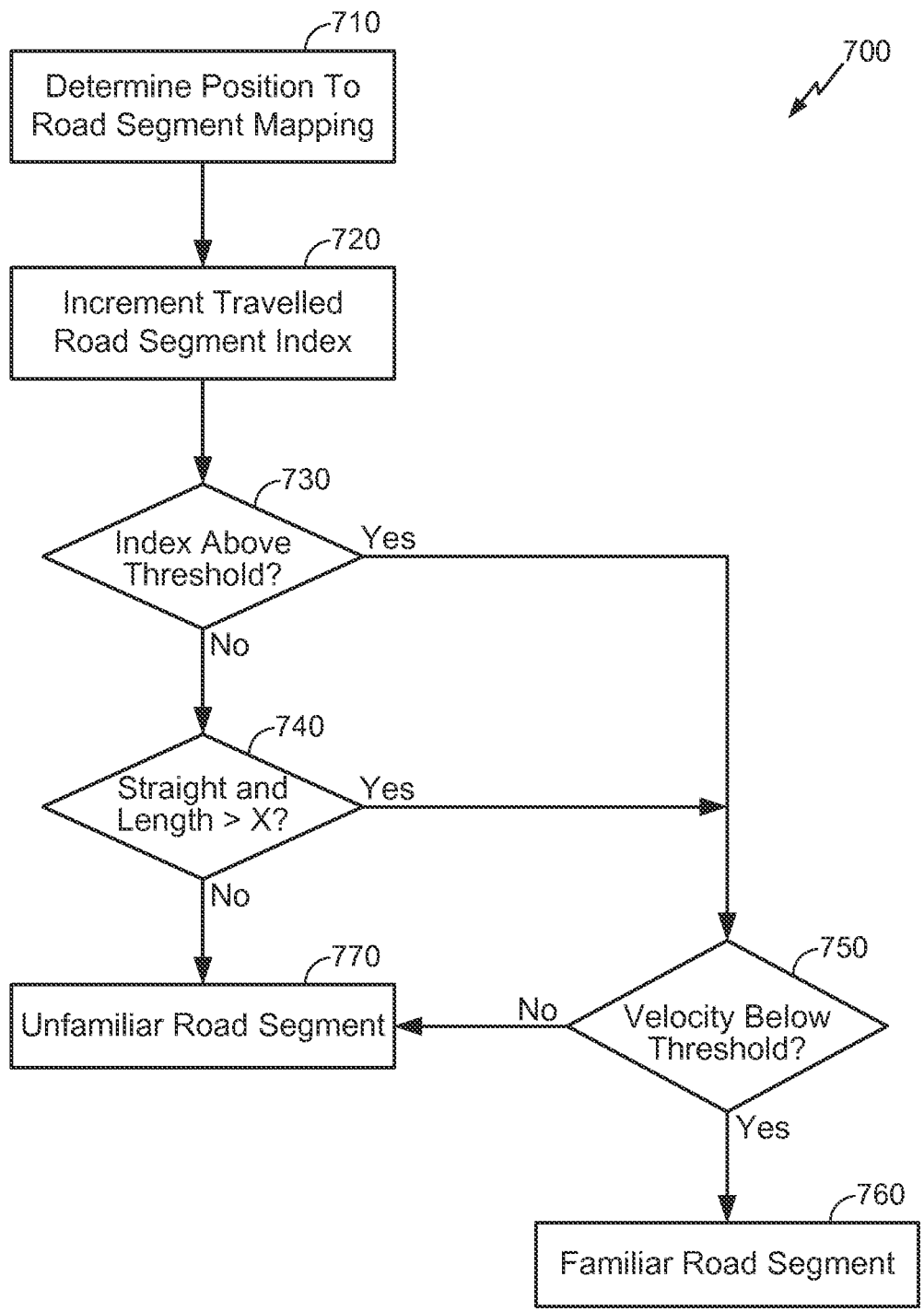
FIG. 7 illustrates an exemplary method to determine whether a road segment mapped to a current position associated with a PND or other mobile device may be considered familiar or unfamiliar, according to one aspect of the disclosure.

According to one aspect of the disclosure, FIG. 7 illustrates an exemplary method 700 to determine whether a road segment mapped to a current position associated with the mobile navigation device may be considered familiar or unfamiliar. More particularly, in response to determining a mapping between a current position associated with the mobile navigation device and a current road segment at block 710, a traveled index associated with the current road segment may be appropriately incremented at block 720. For example, referring back to FIG. 4A, block 720 may increment the traveled indices associated with road segments S0, S3, S4, and S7 following an initial trip and referring to FIG. 4B, block 720 may likewise increment the traveled indices associated with road segments S0, S3, S5, S6, and S7. Accordingly, in one embodiment, an initial "familiarity" determination made at block 730 may simply depend on whether the traveled index associated with the current road segment exceeds a "familiarity" threshold value. However, even if the traveled index associated with the current road segment does not exceed the "familiarity" threshold, an initial "familiarity" determination nonetheless be made at block 740 if the current road segment is substantially straight and has a length that exceeds a certain threshold distance (e.g., two kilometers, a user-defined distance, or another suitable threshold distance, denoted in FIG. 7 as "X"). As such, block 740 may result in the initial "familiarity" determination if the current road segment is substantially straight and has a length that exceeds the threshold distance even though the road may otherwise be considered unfamiliar, which may reflect a use case where highways and other road segments may be easy to navigate despite being unfamiliar. However, in the event that the familiarity determination was based on the road segment being substantially straight for more than the threshold distance, the road segment may revert to being considered "unfamiliar" upon approaching an exit to the highway, curves in the road, etc. (e.g., where the road segment ceases to be straight). In any case, whether the initial familiarity determination was based on the traveled index or the road segment being straight, a speed limit may be applied as a filter at block 750, wherein if a current speed or current velocity (obtained from VOIS measurements) does not exceed a particular threshold value (e.g., 120 kilometers per hour), the road segment may be considered familiar at block 760. Otherwise, if the traveled index does not exceed the threshold, the road segment is not substantially straight, or the current velocity exceeds the threshold value, the road segment may be considered unfamiliar at block 770.

Figure 8A:
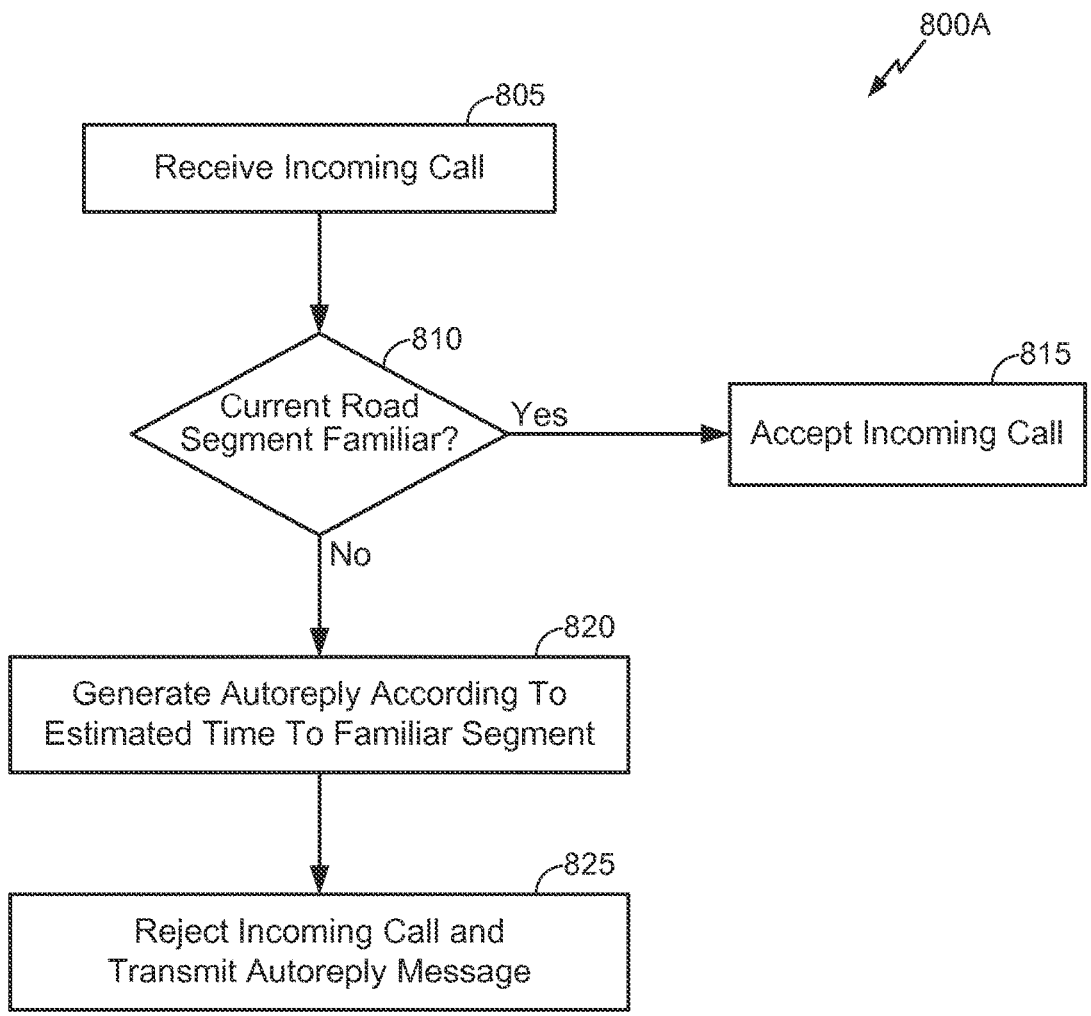
FIGS. 8A-B illustrate exemplary methods to handle incoming calls based on whether the incoming calls are received while navigating along familiar or unfamiliar road segments, according to one aspect of the disclosure.
Figure 8B:
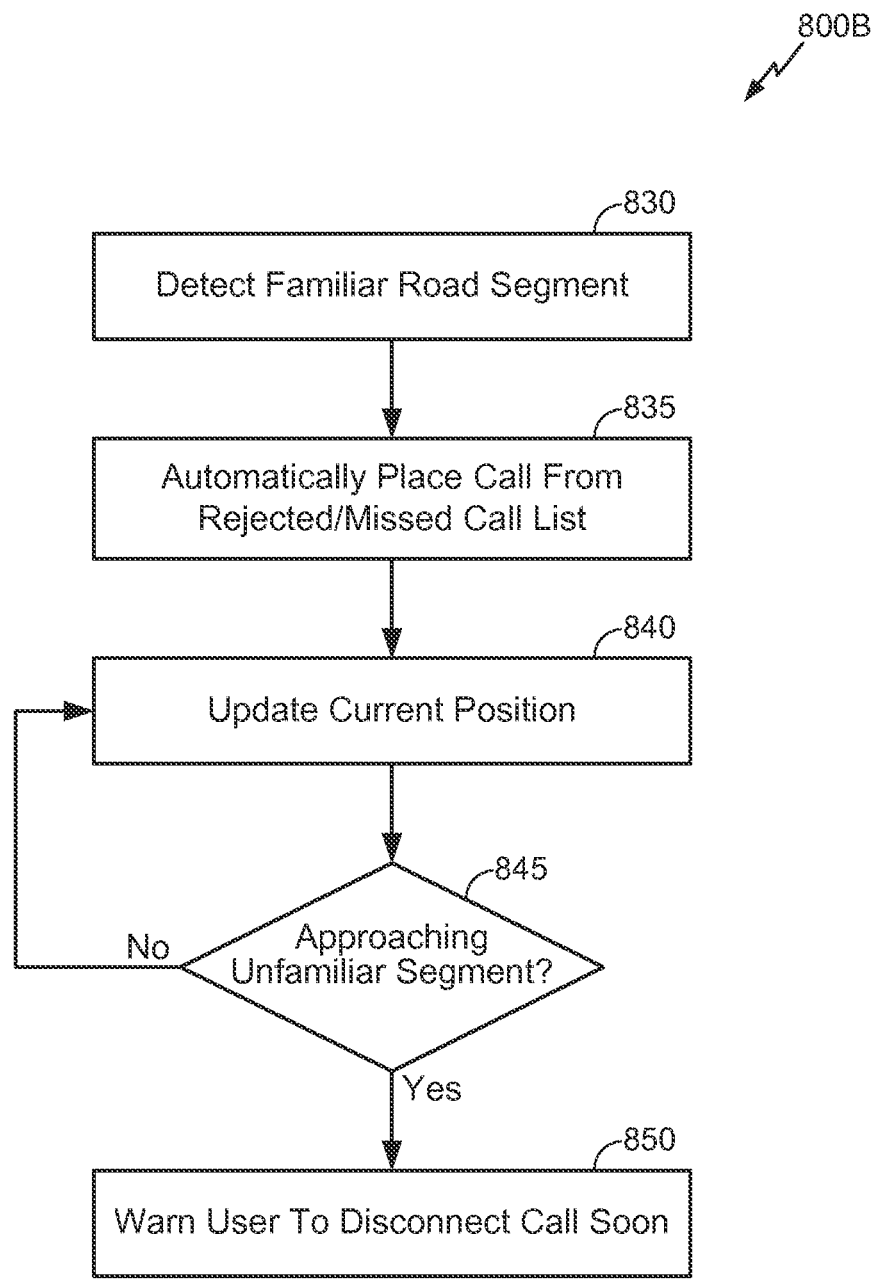

According to one aspect of the disclosure, FIGS. 8A-B illustrate exemplary methods to handle incoming calls based on whether the incoming calls are received while navigating along familiar or unfamiliar road segments. In particular, existing systems to handle incoming calls in a navigation context generally result in mobile navigation devices either accepting or rejecting an incoming call when the user is traveling based on a GPS output. Furthermore, existing systems that generate autoreply messages when incoming calls are rejected or missed are typically static or location-based outputs (e.g., a static autoreply may be "Hi, I am driving and will call you back" and a location-based autoreply may be "Hi, I am driving at Hervanta and will call you back"). In contrast, the method 800A shown in FIG. 8A may comprise receiving an incoming call at block 805 and automatically accepting the incoming call at block 815 in response to determining (at block 810) that the incoming call was received while a current position corresponds to a familiar road segment. Alternatively, the incoming call may be rejected in response to block 810 resulting in a determination that the incoming call was received on an unfamiliar road segment. For example, in one embodiment, rejecting the incoming call may comprise generating an autoreply message at block 820 according to a probable time that the user may return the call or otherwise based on a navigation context, which may depend on an estimated time to travel to enter a familiar route segment or to reach a final destination.

Accordingly, when the incoming call is ultimately rejected at block 825, the autoreply message may be transmitted to the caller, wherein the transmitted autoreply message may indicate the probable time that the user may return the call (e.g., "Hi, I am driving at Pasila and should be able to call you back after 17 minutes."). For example, referring now to FIG. 8B, the mobile navigation device may detect that the current position corresponds to a familiar road segment at block 830 and then automatically place a return call from a rejected/missed call list at block 835 upon determining that the user is entering a familiar road segment or has otherwise reached the final destination. Furthermore, if the current position corresponds to a familiar road segment rather than the final destination, the mobile navigation device may continue to update the current position at block 840, whereby in response to determining that the user is approaching an unfamiliar road segment at block 845, the user may be warned to disconnect the call soon at block 850. Furthermore, in one embodiment, the speed limit check discussed above with respect to FIG. 7 may be employed in connection with FIGS. 8A-B as well, in that the feature to automatically return a rejected or missed call may only be enabled if the current speed or velocity does not exceed a certain threshold over which the user should focus on driving rather than non-driving tasks.

Figure 9A:
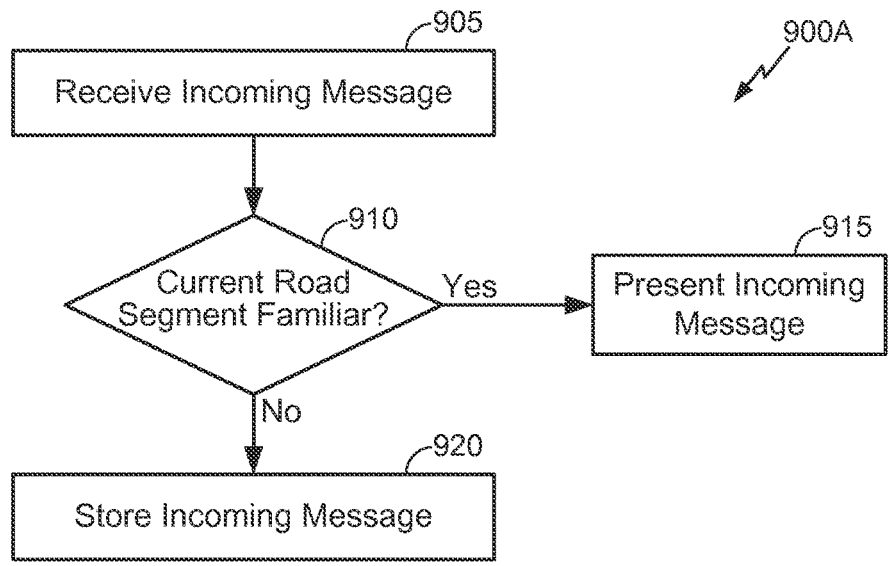
FIGS. 9A-B illustrate exemplary methods to handle incoming messages based on whether the incoming messages are received while navigating along familiar or unfamiliar road segments, according to one aspect of the disclosure.
Figure 9B:
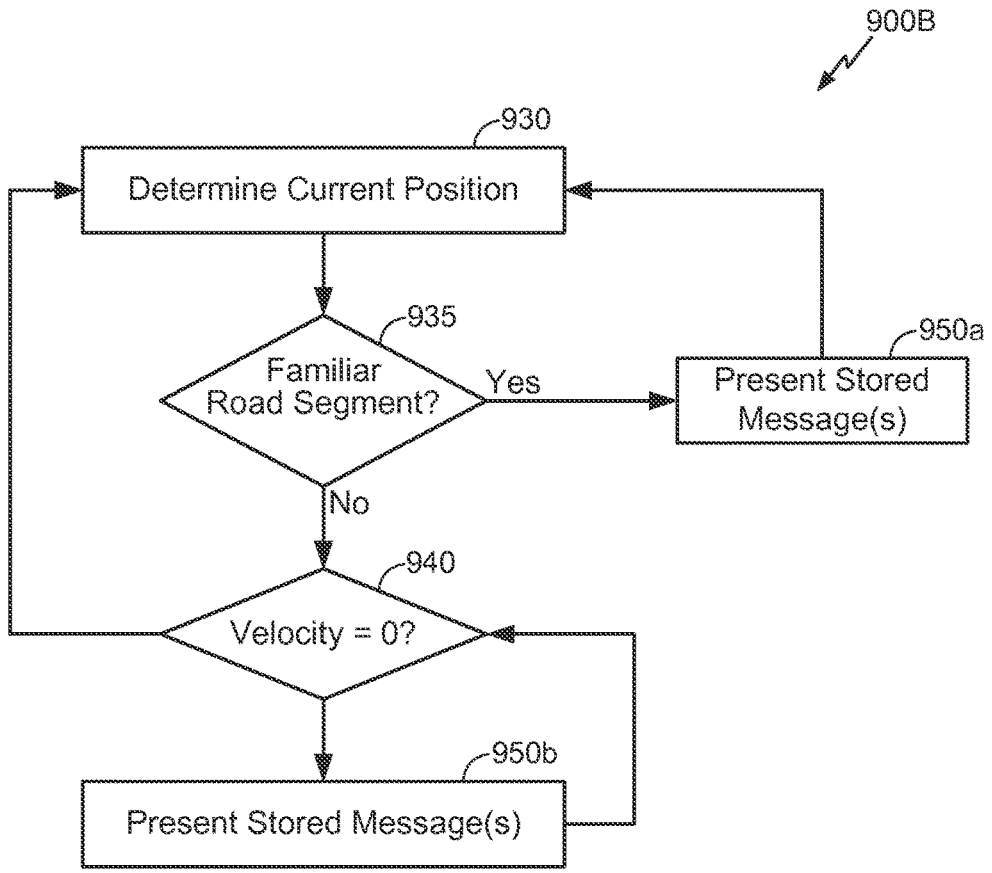

According to one aspect of the disclosure, FIGS. 9A-B illustrate exemplary methods to handle incoming messages based on whether the incoming messages are received while navigating along familiar or unfamiliar road segments. In particular, existing systems to handle incoming messages in a navigation context generally show new incoming messages (e.g., e-mails, text messages, location-based advertisements, etc.) in a status or notification area. However, when a user is traveling in unknown areas or at high speeds, the priority should be to focus on driving and navigation tasks rather than browsing through messages. Furthermore, even if a user ignores messages while traveling at high speeds or in unfamiliar areas, the user would have to manually exit the navigation application and open a messaging application upon entering familiar road segments to view the messages, which can involve substantial inconvenience. In contrast, the method 900A shown in FIG. 9A may comprise receiving an incoming message at block 905 and automatically presenting the incoming message in the normal manner at block 915 in response to determining (at block 910) that the incoming message was received while a current position corresponds to a familiar road segment. Alternatively, the incoming message may be stored at block 920 in response to block 910 resulting in a determination that the incoming message was received on an unfamiliar road segment. Accordingly, referring now to FIG. 9B, the mobile navigation device may determine a current position associated therewith at block 930 and automatically present any previously stored messages at block 950*a* in response to determining that the user is entering a familiar road segment or has otherwise reached the final destination. Alternatively, in response to determining that the current speed or velocity equals zero at block 940, meaning that the vehicle is stopped (e.g., at a red light), any previously stored messages may likewise be presented at block 950*b*. In other words, the method 900B shown in FIG. 9B may show all e-mails, location-based advertisements, or other incoming messages that were received while traveling on unfamiliar road segments or at high speeds upon entering a familiar road segment (e.g., at block 950*a*) and continue to show all such messages until the user enters an unfamiliar road segment or starts to travel at high speeds, or alternatively such messages may be shown upon entering a stationary state (e.g., at block 950*b*) and continued to be shown until the movement or a change in velocity is detected, at which time the mobile navigation device may display the normal navigation screen.

Figure 10:
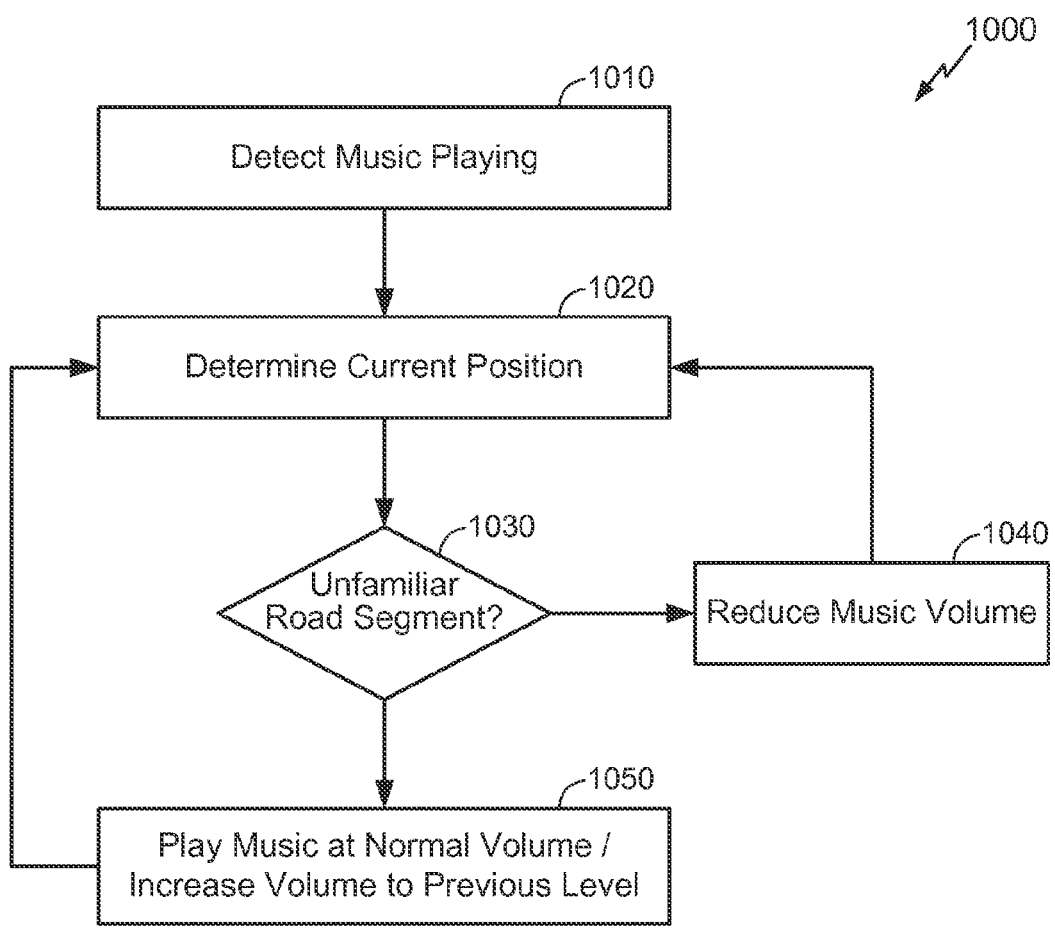
FIG. 10 illustrates an exemplary method to handle volume associated with music or other audio playing in a surrounding navigation environment based on whether a road segment mapped to a current position may be considered familiar or unfamiliar, according to one aspect of the disclosure.

According to one aspect of the disclosure, FIG. 10 illustrates an exemplary method 1000 to handle volume associated with music, audio, or other media playing in a surrounding navigation environment based on whether a road segment mapped to a current position may be considered familiar or unfamiliar. In particular, when traveling on familiar roads, users may tend to relax and enjoy music at a high volume. However, on unknown roads, upon approaching highway exits, and in other navigation contexts, more importance may be given to hearing GPS voice instructions, which may require the user to manually reduce the music volume or miss certain GPS voice messages if there is a delay in manually reducing the music volume. Accordingly, the method 1000 shown in FIG. 10 may initially detect media playing via the mobile navigation device at block 1010, wherein the mobile navigation device may determine a current position associated therewith at block 1020 and then determine whether or not the current position corresponds to an unfamiliar road segment at block 1030. In one embodiment, in response to determining that the current position corresponds to an unfamiliar road segment, the mobile navigation device may automatically reduce (or turn off) the music volume at block 1040 to ensure that GPS voice instructions will be clearly heard. Alternatively, in response to determining that the current position corresponds to a familiar road segment, the mobile navigation device may continue to play the media at the normal volume at block 1050. Likewise, following any reduction in the music volume at block 1040 and subsequently determining that the current position corresponds to a familiar road segment, the mobile navigation device may increase the music volume to the previous level at block 1050.

Figure 11:
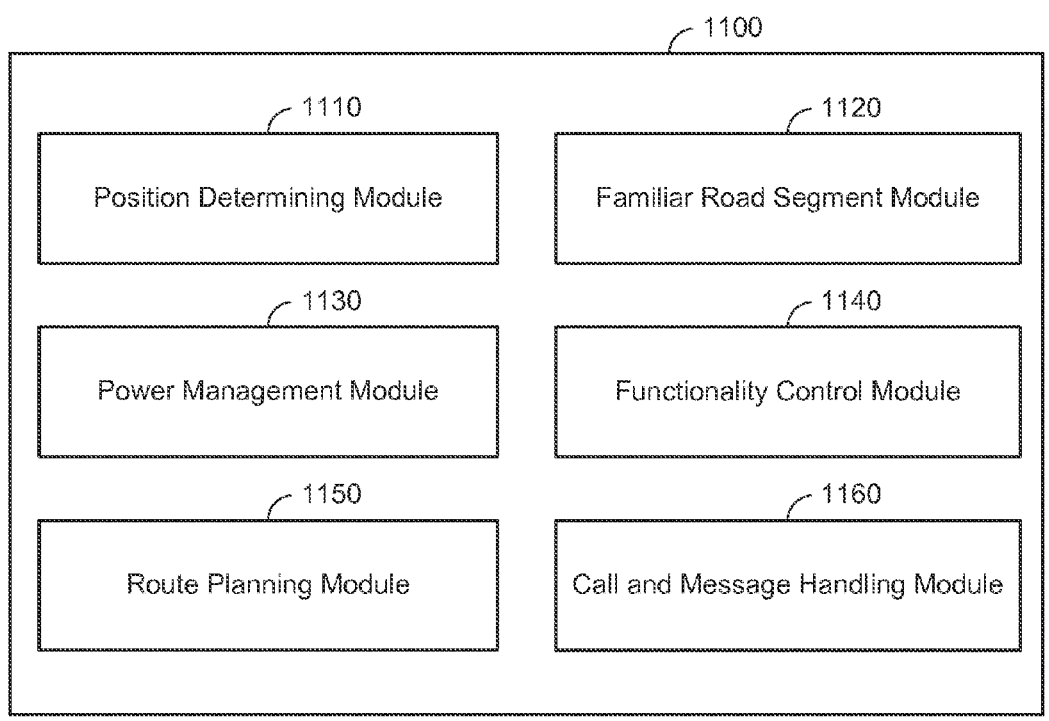
FIG. 11 illustrates an exemplary modular architecture that may be used to reduce power consumption and improve overall user experience when navigating along familiar routes or familiar road segments using a suitable device that implements the modular architecture shown in FIG. 11, according to one aspect of the disclosure.

According to one aspect of the disclosure, FIG. 11 illustrates an exemplary modular architecture 1100 that may be used to reduce power consumption and improve overall user experience when navigating along familiar routes or familiar road segments using a suitable device that implements the modular architecture 1100 shown therein. In particular, the modular architecture 1100 shown in FIG. 11 may include a position determining module 1110 configured to determine a current position associated with the device that implements the modular architecture 1100 (e.g., using one or more receivers that can acquire satellite signals, a navigation fix unit that may combine one or more location estimators to determine the current position based on satellite signals, advance a previous position fix using accelerometer, gyroscope, vehicle odometry and inertial sensor measurements, etc. according to dead reckoning techniques, etc.). In addition, the modular architecture 1100 may include a familiar road segment module 1120 configured to associate various road segments with an index that indicates a familiarity associated therewith (e.g., a "familiarity index") based at least on how many times the road segments have been previously traversed (e.g., the familiarity index associated with a particular road segment may be incremented each time that the road segment is traversed). Furthermore, in one embodiment, the familiar road segment module 1120 may be configured to associate various road segments with dates, timestamps, or other historical travel data indicating when the respective road segments were traversed and decrease the familiarity index with respect to road segments that are associated with dates, timestamps, or other historical travel data indicating that the respective road segments have not been traversed within a predetermined time period. For example, the familiarity index may be decreased with respect to road segments that have not been traveled recently to reflect that a user may currently be less familiar with the road segments relative to when the road segments were last traversed. However, because the user may have more familiarity with road segments that were previously traveled relative to road segments that are entirely new, the decreased familiarity index associated with the road segments that have not been traveled within the predetermined time period may be increased more aggressively when the road segments are traveled again (e.g., restoring the familiarity index to the initial value that existed prior to the decreasing or incrementing the familiarity index according to an increased factor in response to the user traversing the road segment again, traversing the road segment a threshold number of times within a certain time period, etc.).

In one embodiment, to determine whether the current position associated with the device corresponds to a familiar road segment, the familiar road segment module 1120 may correlate the current position to a particular road segment and determine whether the road segment correlated to the current position has an index that exceeds a predetermined "familiarity" threshold. As such, the familiar road segment module 1120 may determine that the current position corresponds to a familiar road segment if the road segment correlated thereto has an index that exceeds the familiarity threshold and a current velocity associated with the device not does not exceed a predefined speed limit, wherein the positioning determining module 1110 may determine the current velocity based on one or more vehicle odometry and inertial sensor (VOIS) measurements. Alternatively, even if the road segment correlated to the current position has an index that does not exceed the predetermined familiarity threshold, the familiar road segment module 1120 may determine that the current position corresponds to a familiar road segment if the road segment correlated thereto is substantially straight (e.g., has substantially no turns for a predefined threshold distance) and the current velocity does not exceed the predefined speed limit. In contrast, the familiar road segment module 1120 may determine that the current position does not correspond to a familiar road segment if the road segment correlated thereto has an index that does not exceed the familiarity threshold and is not considered substantially straight (e.g., has one or more turns, has substantially no turns but is shorter than the threshold distance, etc.), or the familiar road segment module 1120 may alternatively determine that the current position does not correspond to a familiar road segment if the current velocity exceeds the predefined speed limit even if the road segment correlated has an index that exceeds the familiarity threshold and/or the road segment is considered substantially straight (i.e., the speed limit may provide a filter to ensure that the functions performed on familiar road segments are not invoked at high speeds and thereby ensure that the user focuses on driving while traveling at high speeds).

In one embodiment, the modular architecture 1100 may further include a power management module 1130, a functionality control module 1140, a route planning module 1150, and a call and message handling module 1160 that may be configured to implement various mechanisms to reduce power consumption and improve overall user experience based on whether the familiar road segment module 1120 determines that the current position corresponds or does not correspond to a familiar road segment. For example, in one embodiment, the power management module 1130 may be configured to disable a display coupled to or otherwise associated with the device in response to the familiar road segment module 1120 determining that the current position associated with the device corresponds to a familiar road segment and the functionality control module 1140 may be configured to disable voice assistance on the device if the current position corresponds to a familiar road segment. Furthermore, in one embodiment, the power management module 1130 may cause the position determining module 1110 to reduce a frequency at which one or more satellite signals are received or otherwise acquired to determine the current position if the current position corresponds to a familiar road segment. In the event that the power management module 1130 causes the position determining module 1110 to receive or otherwise acquire the satellite signals at a reduced frequency, the position determining module 1110 may use signals or other measurements acquired from one or more sensors coupled to or otherwise associated with the device to advance the current position according to dead reckoning techniques, wherein the functionality control module 1140 may subsequently enable the voice assistance (if currently disabled) in response to the advanced current position corresponding to an unfamiliar road segment. In a similar respect, the power management module 1130 may enable the display (if currently disabled) and/or cause the position determining module 1110 to increase the frequency at which the satellite signals are acquired if the advanced current position corresponds to an unfamiliar road segment. Moreover, the functionality control module 1140 may automatically terminate or otherwise exit a navigation application executing on the device in response to determining that the familiar road segment includes a final route destination, which may be known or otherwise available via the route planning module 1150, and the functionality control module 1140 may further reduce a volume level used to play media via the device at a reduced level if the current position corresponds to an unfamiliar road segment and/or restore the volume used to play the media to a normal level or the previous level in response to the position determining module 1110 updating the current position and the familiar road segment module 1120 determining that the updated current position corresponds to a familiar road segment.

In one embodiment, the route planning module 1150 may be used to support route calculations that are based on the historical travel data managed using the familiar road segment module 1120. For example, in one embodiment, the route planning module 1150 may be configured to compare calculated or proposed routes to routes that are actually traversed and prioritize road segments that were actually traversed over road segments in the calculated or proposed routes that were avoided or otherwise untraveled. Accordingly, in one embodiment, the route planning module 1150 may be configured to receive a request to plan a route associated with the device, wherein the request may include at least a final route destination, and the route planning module 1150 may then determine preferred road segments that include road segments having familiarity indices that exceed the above-mentioned familiarity threshold and/or road segments that were traversed in one or more previous routes and did not match road segments included in the routes that were initially calculated or proposed, whereby the route that the route planning module 1150 calculates may prioritize the preferred road segments based on previous route deviations and familiar road segments based on the familiarity indices associated therewith.

In one embodiment, the call and message handling module 1160 may provide various functions to ensure that users focus on navigation tasks having a high priority when traveling on unknown road segments or road segments that have substantial turns or other spatial characteristics that may require focused attention on driving over other non-navigation tasks and further to provide more contextually-relevant call and message handling functions. For example, the call and message handling module 1160 may accept an incoming call if the current position associated with the device corresponds to a familiar road segment or alternatively reject the incoming call if the current position corresponds to an unfamiliar road segment. In the latter case, the call and message handling module 1160 may further generate an autoreply message indicating an estimated time when the rejected incoming call will be returned based on an estimated travel time from the current position to a familiar road segment. As such, in response to the position determining module 1110 updating the current position and the familiar road segment module 1120 determining that the updated current position corresponds to a familiar road segment, the call and message handling module 1160 may automatically return the rejected incoming call. In a similar respect, the call and message handling module 1160 may store one or more incoming messages (e.g., text messages, location-based advertisements, etc.) that are received while the current position corresponds to an unfamiliar road segment and subsequently display the stored incoming messages when the current position corresponds to a familiar road segment until the current position changes to an unfamiliar road segment. Alternatively, the call and message handling module 1160 may display the stored incoming messages when a current velocity equals zero and continue to display the stored messages until the current velocity does not equal zero (e.g., displaying the stored messages while stopped, such as at a red light or in heavy traffic, and ceasing to display the stored messages when travel resumes).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components in a user terminal.

In one or more exemplary aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for improving user experience when using a mobile navigation device to navigate along familiar routes, comprising:
   determining a current position associated with the mobile navigation device;
   determining whether a road segment corresponding to the current position associated with the mobile navigation device is familiar based at least in part on historical travel data; and
   reducing presentation of media playing in an environment surrounding the mobile navigation device in response to determining that the road segment corresponding to the current position associated with the mobile navigation device is not familiar, wherein reducing the presentation further comprises:
      playing the media in the environment surrounding the mobile navigation device at a reduced level in response to determining that the road segment corresponding to the current position associated with the mobile navigation device is not familiar;
      updating the current position associated with the mobile navigation device; and
      playing the media in the environment surrounding the mobile navigation device at a normal level in response to determining that a current road segment corresponding to the updated current position is familiar.

2. The method recited in claim 1, further comprising:
   disabling voice assistance and a display on the mobile navigation device in response to determining that the road segment corresponding to the current position associated with the mobile navigation device is familiar; and
   reducing a frequency at which a receiver on the mobile navigation device acquires one or more signals to determine the current position associated with the mobile navigation device in response to determining that the road segment corresponding to the current position associated with the mobile navigation device is familiar.

3. The method recited in claim 2, further comprising:
   using signals acquired from one or more motion sensors on the mobile navigation device to advance the current position associated with the mobile navigation device; and
   enabling the voice assistance and the display on the mobile navigation device in response to the advanced current position corresponding to an unfamiliar road segment.

4. The method recited in claim 2, further comprising:
   using signals acquired from one or more motion sensors on the mobile navigation device to advance the current position associated with the mobile navigation device; and
   increasing the frequency at which the receiver acquires the one or more signals to determine the current position associated with the mobile navigation device in response to the advanced current position corresponding to an unfamiliar road segment.

5. The method recited in claim 1, further comprising:
   automatically terminating a navigation application executing on the mobile navigation device in response to determining that the road segment corresponding to the current position associated with the mobile navigation device is familiar and further that the road segment corresponding to the current position includes a final route destination.

6. The method recited in claim 1, further comprising:
   storing the historical travel data in a navigation database that associates the road segment corresponding to the current position associated with the mobile navigation device with a familiarity index based at least in part on the historical travel data that indicates how many times the road segment has been previously traversed; and
   determining that the road segment corresponding to the current position associated with the mobile navigation device is familiar in response to the familiarity index associated with the road segment exceeding a predetermined threshold and a current velocity not exceeding a predefined speed limit.

7. The method recited in claim 6, further comprising:
   receiving a request to plan a route associated with the mobile navigation device, wherein the request includes at least a final destination associated with the route;
   determining one or more familiar road segments based at least in part on the historical travel data stored in the navigation database indicating that the familiarity index associated with the one or more familiar road segments exceeds the predetermined threshold;
   determining one or more preferred road segments based at least in part on the historical travel data stored in the navigation database indicating that the one or more preferred road segments were traversed in one or more previous routes and were not initially included in the one or more previous routes; and
   calculating the route associated with the mobile navigation device, wherein the calculated route prioritizes the one or more preferred road segments and the one or more familiar road segments.

8. The method recited in claim 7, further comprising:
associating the one or more familiar road segments in the navigation database with one or more of dates or timestamps that indicate when the one or more familiar road segments were traversed based on the historical travel data; and
decreasing the familiarity index associated with at least one of the one or more familiar road segments that is associated with one or more of a date or a timestamp indicating that the at least one familiar road segment has not been traversed within a predetermined time period.

9. The method recited in claim 7, further comprising:
automatically terminating a navigation application executing on the mobile navigation device in response to determining that the road segment corresponding to the current position associated with the mobile navigation device is one of the one or more familiar road segments and includes the final destination associated with the route.

10. The method recited in claim 1, further comprising:
determining that the road segment corresponding to the current position associated with the mobile navigation device is familiar in response to the road segment having substantially no turns for a predefined distance and a current velocity not exceeding a predefined speed limit.

11. The method recited in claim 1, wherein the media playing in the environment surrounding the mobile navigation device comprises non-navigation media.

12. A method for improving user experience when using a mobile navigation device to navigate along familiar routes, comprising:
determining a current position associated with the mobile navigation device;
determining whether the current position associated with the mobile navigation device corresponds to a familiar road segment;
receiving an incoming call;
accepting the incoming call if the current position associated with the mobile navigation device corresponds to the familiar road segment; and
rejecting the incoming call if the current position associated with the mobile navigation device corresponds to an unfamiliar road segment, wherein rejecting the incoming call comprises generating an autoreply message indicating an estimated time when the rejected incoming call will be returned based on an estimated travel time from the current position to the familiar road segment.

13. The method recited in claim 12, further comprising:
updating the current position associated with the mobile navigation device; and
automatically returning the rejected incoming call in response to determining that the updated current position corresponds to the familiar road segment.

14. An apparatus, comprising:
a navigation fix unit configured to determine a current position fix; and
one or more processors configured to correlate the current position fix to a road segment, determine whether the road segment correlated to the current position fix is familiar based at least in part on historical travel data, and reduce presentation of media playing in an environment surrounding the apparatus in response to a determination that the road segment correlated to the current position fix is not familiar, wherein the one or more processors are further configured to:
cause an output device in the environment surrounding the apparatus to play the media at a reduced level in response to the road segment correlated to the current position fix not being familiar; and
cause the output device to play the media at a normal level in response to the navigation fix unit computing an updated position fix corresponding to a current road segment that is familiar.

15. The apparatus recited in claim 14, further comprising:
a measurement engine configured to acquire one or more satellite signal measurements, wherein the one or more processors are further configured to:
cause the measurement engine to acquire the one or more satellite signal measurements at a reduced frequency in response to the road segment correlated to the current position fix being familiar; and
disable navigation voice assistance and a display coupled to the apparatus in response to the road segment correlated to the current position fix being familiar.

16. The apparatus recited in claim 15, further comprising:
a sensor data processor configured to acquire one or more motion measurements associated with the apparatus, wherein the navigation fix unit is further configured to advance the current position fix using the one or more motion measurements acquired via the sensor data processor, and wherein the one or more processors are further configured to enable the navigation voice assistance and enable the display coupled to the apparatus in response to the advanced current position fix corresponding to an unfamiliar road segment.

17. The apparatus recited in claim 15, further comprising:
a sensor data processor configured to acquire one or more motion measurements associated with the apparatus, wherein the navigation fix unit is further configured to advance the current position fix using the one or more motion measurements acquired via the sensor data processor, and wherein the one or more processors are further configured to cause the measurement engine to acquire the one or more satellite signal measurements at an increased frequency in response to the advanced current position fix corresponding to an unfamiliar road segment.

18. The apparatus recited in claim 14, wherein the one or more processors are further configured to automatically terminate a navigation application executing on the apparatus in response to the road segment correlated to the current position fix being familiar and including a final route destination.

19. The apparatus recited in claim 14, further comprising:
a sensor data processor configured to acquire one or more motion measurements associated with the apparatus, wherein the one or more motion measurements indicate at least a current velocity associated with the apparatus; and
a memory configured to store the historical travel data, wherein the stored historical travel data associates the road segment correlated to the current position fix with a familiarity index based at least in part on the historical travel data that indicates how many times the road segment has been previously traversed, and wherein the one or more processors are further configured to determine that the road segment correlated to the current position fix is familiar in response to the familiarity index associated with the road segment exceeding a predetermined threshold and in response to the current velocity not exceeding a predefined speed limit.

20. The apparatus recited in claim 19, wherein the one or more processors are further configured to:
   determine one or more familiar road segments based at least in part on the historical travel data stored in the memory indicating that the familiarity index associated with the one or more familiar road segments exceeds the predetermined threshold;
   determine one or more preferred road segments that were traversed in one or more previous routes and not initially included in the one or more previous routes based at least in part on the historical travel data stored in the memory in response to a request to plan a route to a final destination; and
   calculate the route to prioritize the one or more preferred road segments and the one or more familiar road segments.

21. The apparatus recited in claim 20, wherein the one or more familiar road segments stored in the memory are each further associated with one or more of dates or timestamps indicating when the one or more familiar road segments were traversed based on the historical travel data, and wherein the one or more processors are further configured to decrease the familiarity index associated with at least one of the one or more familiar road segments that is associated with one or more of a date or a timestamp indicating that the at least one familiar road segment has not been traversed within a predetermined time period.

22. The apparatus recited in claim 20, wherein the one or more processors are further configured to automatically terminate a navigation application executing on the apparatus in response to the road segment correlated to the current position fix being one of the one or more familiar road segments and including the final destination associated with the route.

23. The apparatus recited in claim 14, further comprising:
   a sensor data processor configured to acquire one or more motion measurements that indicate at least a current velocity associated with the apparatus, wherein the one or more processors are further configured to determine that the road segment correlated to the current position fix is familiar in response to the road segment having substantially no turns for a predefined distance and the current velocity not exceeding a predefined speed limit.

24. The apparatus recited in claim 14, wherein the one or more processors are further configured to detect an incoming call and determine whether to accept or reject the incoming call based on whether the road segment correlated to the current position fix is familiar or unfamiliar.

25. The apparatus recited in claim 14, wherein the media playing in the environment surrounding the apparatus comprises non-navigation media.

26. An apparatus, comprising:
   a navigation fix unit configured to determine a current position fix; and
   one or more processors configured to:
      correlate the current position fix to a road segment;
      detect an incoming call; and
      reject the incoming call and generate an autoreply message to indicate an estimated time when the rejected incoming call will be returned based on an estimated travel time to a familiar road segment in response to the road segment correlated to the current position fix corresponding to an unfamiliar road segment.

27. The apparatus recited in claim 26, wherein the one or more processors are further configured to automatically return the rejected incoming call in response to an updated position fix computed at the navigation fix unit correlating to the familiar road segment.

28. A navigation device, comprising:
   a navigation database that includes a plurality of road segments, wherein the navigation database associates each of the plurality of road segments with a familiarity index;
   one or more processors configured to:
      correlate a current position associated with the navigation device to a current road segment among the plurality of road segments in the navigation database;
      detect an incoming call; and
      reject the incoming call and generate an autoreply message to indicate an estimated time when the rejected incoming call will be returned in response the familiarity index associated with the current road segment not exceeding a predetermined threshold, wherein the estimated time when the rejected incoming call will be returned is based on an estimated travel time to a road segment among the plurality of road segments for which the familiarity index exceeds the predetermined threshold.

29. A navigation device recited in claim 28, wherein the one or more processors are further configured to automatically return the rejected incoming call in response to an updated position associated with the navigation device correlating to the road segment for which the familiarity index exceeds the predetermined threshold.

30. A navigation device, comprising:
   a navigation database that includes a plurality of road segments, wherein the navigation database associates each of the plurality of road segments with a familiarity index based at least in part on historical travel data; and
   one or more processors configured to:
      correlate a current position associated with the navigation device to a road segment among the plurality of road segments in the navigation database;
      determine whether the road segment correlated to the current position is familiar or unfamiliar based at least in part on the historical travel data;
      cause an output device in an environment surrounding the navigation device to play media at a reduced level in response to a determination that the road segment correlated to the current position is unfamiliar;
      update the current position associated with the navigation device; and
      cause the output to play the media at a normal level in response to a determination that a current road segment correlated to the updated current position is familiar.

31. The navigation device recited in claim 30, wherein the media playing in the environment surrounding the navigation device comprises non-navigation media.

32. A non-transitory computer-readable storage medium having computer-executable instructions recorded thereon, wherein executing the computer-executable instructions on a navigation device causes the navigation device to:
   determine a current position associated with the navigation device;
   determine whether the current position associated with the navigation device corresponds to a familiar road segment;

receive an incoming call;

accept the incoming call if the current position associated with the navigation device corresponds to the familiar road segment; and reject the incoming call and generate an autoreply message indicating an estimated time when the rejected incoming call will be returned if the current position associated with the navigation device corresponds to an unfamiliar road segment, wherein the estimated time when the rejected incoming call will be returned is based on an estimated travel time from the current position to the familiar road segment.

33. The non-transitory computer-readable storage medium recited in claim 32, wherein executing the computer-executable instructions on the navigation device further causes the navigation device to automatically return the rejected incoming call in response to an updated current position associated with the navigation device corresponding to the familiar road segment.

34. A non-transitory computer-readable storage medium having computer-executable instructions recorded thereon, wherein executing the computer-executable instructions on a navigation device causes the navigation device to:

determine a current position associated with the navigation device;

determine whether a road segment corresponding to the current position associated with the navigation device is familiar based at least in part on historical travel data;

cause an output device in an environment surrounding the navigation device to play media at a reduced level in response to a determination that the road segment corresponding to the current position associated with the navigation device is unfamiliar;

update the current position associated with the navigation device; and cause the output device to play the media at a normal level in response to a determination that a current road segment corresponding to the updated current position is familiar.

35. The non-transitory computer-readable storage medium recited in claim 34, wherein the media playing in the environment surrounding the navigation device comprises non-navigation media.

* * * * *